(12) United States Patent
Nakayama

(10) Patent No.: US 8,928,990 B2
(45) Date of Patent: Jan. 6, 2015

(54) IMAGE BLUR CORRECTION APPARATUS AND IMAGING APPARATUS

(71) Applicant: Sony Corporation, Tokyo (JP)

(72) Inventor: Tatsuyuki Nakayama, Kanagawa (JP)

(73) Assignee: Sony Corporation, Tokyo (JP)

( * ) Notice: Subject to any disclaimer, the term of this patent is extended or adjusted under 35 U.S.C. 154(b) by 110 days.

(21) Appl. No.: 13/852,016

(22) Filed: Mar. 28, 2013

(65) Prior Publication Data

US 2013/0321931 A1  Dec. 5, 2013

(30) Foreign Application Priority Data

May 29, 2012  (JP) .................................. 2012-122333

(51) Int. Cl.
*G02B 15/14* (2006.01)
*G02B 27/64* (2006.01)
*H04N 5/222* (2006.01)

(52) U.S. Cl.
CPC ............... *G02B 27/64* (2013.01); *H04N 5/222* (2013.01)
USPC .............................. 359/685; 359/557; 396/55

(58) Field of Classification Search
USPC ........ 359/685, 554, 557; 348/208.99; 396/52, 396/55
See application file for complete search history.

(56) References Cited

U.S. PATENT DOCUMENTS

| | | | | |
|---|---|---|---|---|
| 7,742,691 | B2 * | 6/2010 | Takahashi et al. | 396/55 |
| 8,078,042 | B2 * | 12/2011 | Hagiwara et al. | 396/55 |
| 2013/0223829 | A1 * | 8/2013 | Nakayama et al. | 396/55 |

FOREIGN PATENT DOCUMENTS

JP      07-274056 A     10/1995

* cited by examiner

*Primary Examiner* — Jordan Schwartz
(74) *Attorney, Agent, or Firm* — Rader, Fishman & Grauer PLLC

(57) ABSTRACT

Provided is an image blur correction apparatus including a lens unit including at least one lens, and being turnable in a first direction and a second direction, a fixed member turnably supporting the lens unit in the first direction and the second direction, a first drive unit including a pair of first thrust generation units that applies thrust and is positioned on opposite sides sandwiching one of the first supporting and second supporting axe, a second drive unit including a pair of second thrust generation units that applies thrust and is positioned on opposite sides sandwiching another of the first and second supporting axe, a pair of first detection units being positioned on opposite sides sandwiching one of the first and second supporting axe, and a pair of second detection units being positioned on opposite sides sandwiching another of the first and second supporting axe.

8 Claims, 30 Drawing Sheets

20 · · · IMAGE BLUR CORRECTION APPARATUS
21 · · · LENS UNIT
22 · · · FIXED MEMBER
30 · · · FIRST DRIVE UNIT
31 · · · SECOND DRIVE UNIT

1 ··· IMAGING APPARATUS
2 ··· OUTER HOUSING
20 ··· IMAGE BLUR CORRECTION APPARATUS
21 ··· LENS UNIT

1 · · · IMAGING APPARATUS
2 · · · OUTER HOUSING

20 · · · IMAGE BLUR CORRECTION APPARATUS
21 · · · LENS UNIT
22 · · · FIXED MEMBER

20 ··· IMAGE BLUR CORRECTION APPARATUS
21 ··· LENS UNIT
22 ··· FIXED MEMBER
30 ··· FIRST DRIVE UNIT
31 ··· SECOND DRIVE UNIT

20 ··· IMAGE BLUR CORRECTION APPARATUS
21 ··· LENS UNIT
22 ··· FIXED MEMBER
30 ··· FIRST DRIVE UNIT
31 ··· SECOND DRIVE UNIT

FIG. 9
20 ··· IMAGE BLUR CORRECTION APPARATUS
21 ··· LENS UNIT
22 ··· FIXED MEMBER
28 ··· FIRST DETECTION UNIT
29 ··· SECOND DETECTION UNIT
30 ··· FIRST DRIVE UNIT
31 ··· SECOND DRIVE UNIT
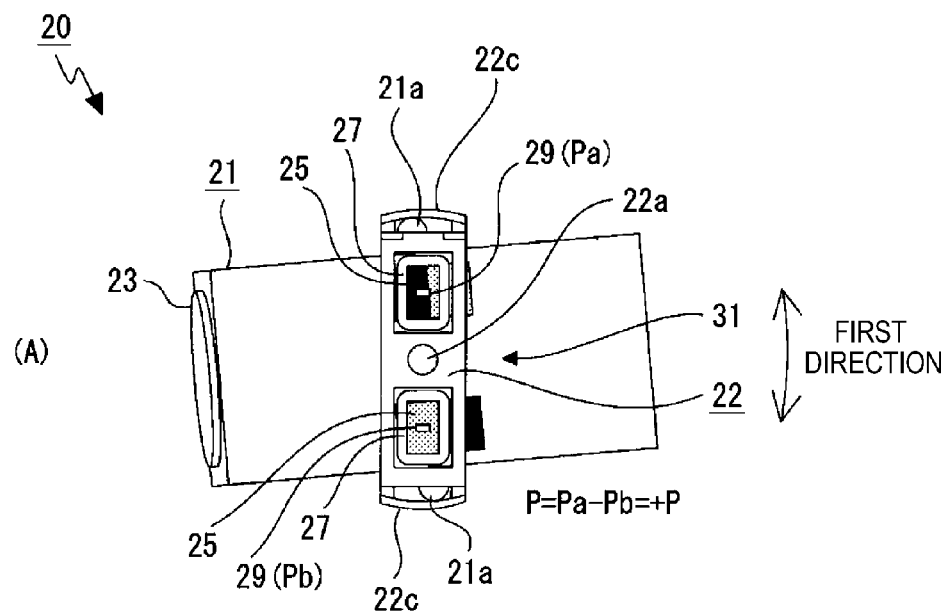
(A) P=Pa−Pb=+P
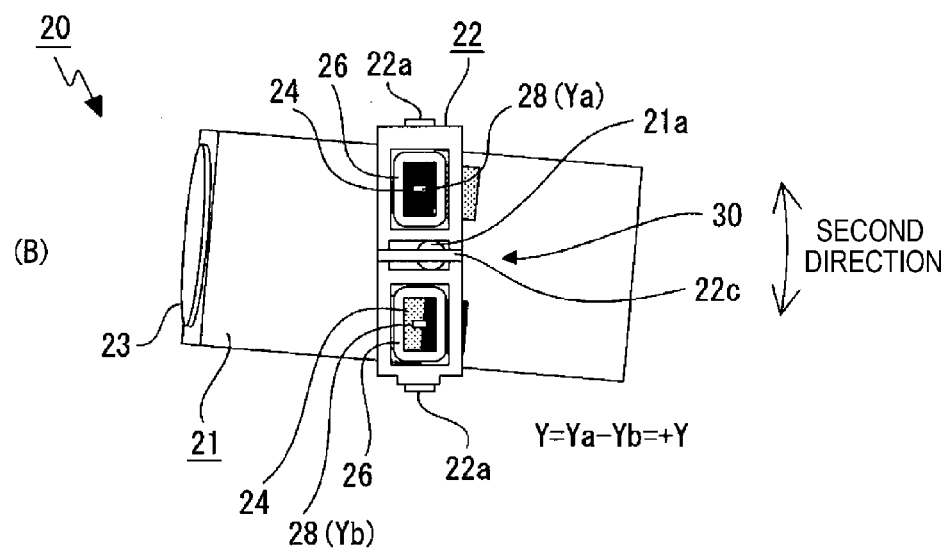
(B) Y=Ya−Yb=+Y 20 ··· IMAGE BLUR CORRECTION APPARATUS
21 ··· LENS UNIT
22 ··· FIXED MEMBER
28 ··· FIRST DETECTION UNIT
29 ··· SECOND DETECTION UNIT
30 ··· FIRST DRIVE UNIT
31 ··· SECOND DRIVE UNIT 20 ··· IMAGE BLUR CORRECTION APPARATUS
21 ··· LENS UNIT
22 ··· FIXED MEMBER
28 ··· FIRST DETECTION UNIT
29 ··· SECOND DETECTION UNIT
30 ··· FIRST DRIVE UNIT
31 ··· SECOND DRIVE UNIT 20 ··· IMAGE BLUR CORRECTION APPARATUS
21 ··· LENS UNIT
22 ··· FIXED MEMBER
28 ··· FIRST DETECTION UNIT
29 ··· SECOND DETECTION UNIT
30 ··· FIRST DRIVE UNIT
31 ··· SECOND DRIVE UNIT

FIG. 21
20 · · · IMAGE BLUR CORRECTION APPARATUS
21 · · · LENS UNIT
22 · · · FIXED MEMBER
28 · · · FIRST DETECTION UNIT
29 · · · SECOND DETECTION UNIT
30 · · · FIRST DRIVE UNIT
31 · · · SECOND DRIVE UNIT
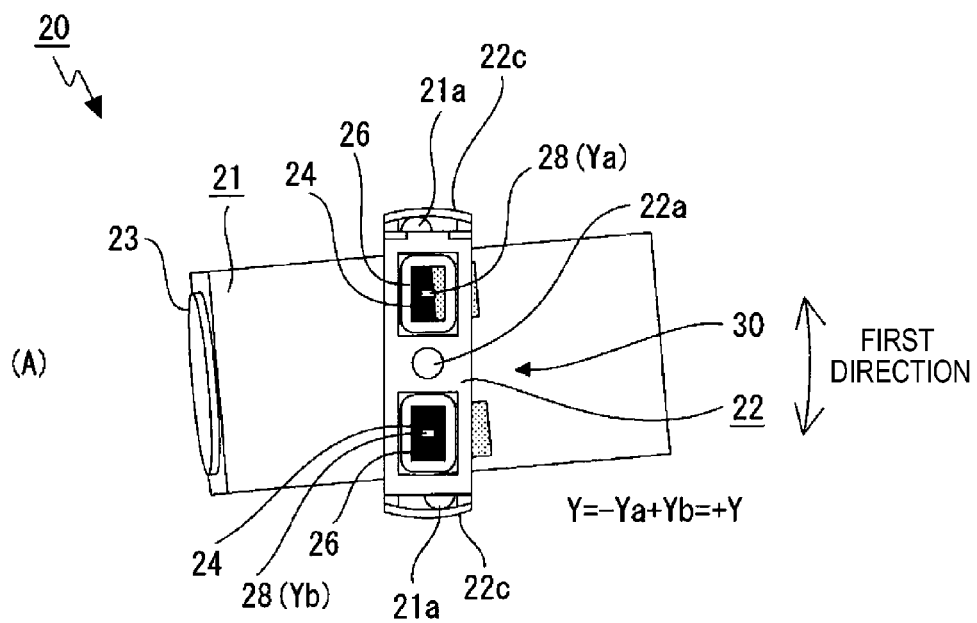
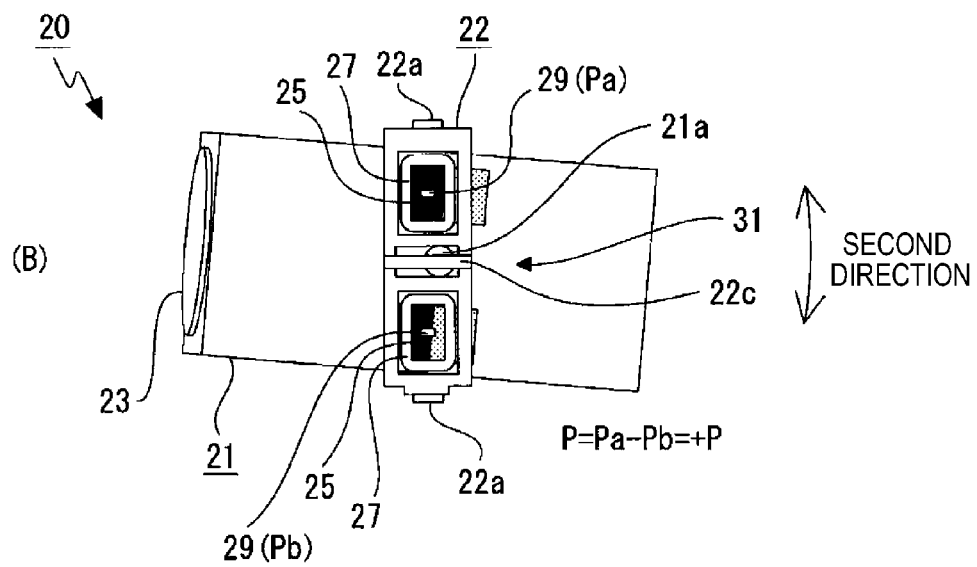

20A · · · IMAGE BLUR CORRECTION APPARATUS
21A · · · LENS UNIT
22A · · · FIXED MEMBER
34 · · · MAIN BODY
35 · · · SUPPORT MEMBER
36 · · · TURNING ACTUATOR $Y = Ya - Yb = 0$
$P = Pa - Pb = 0$
$R = Ya + Yb + Pa + Pb = 0$

21A · · · LENS UNIT
22A · · · FIXED MEMBER
28 · · · FIRST DETECTION UNIT
29 · · · SECOND DETECTION UNIT
30 · · · FIRST DRIVE UNIT
31 · · · SECOND DRIVE UNIT $Y = Ya - Yb = +Y$
$P = Pa - Pb = 0$
$R = Ya + Yb + Pa + Pb = 0$

21A · · · LENS UNIT
22A · · · FIXED MEMBER
28  · · · FIRST DETECTION UNIT
29  · · · SECOND DETECTION UNIT
30  · · · FIRST DRIVE UNIT
31  · · · SECOND DRIVE UNIT $Y = Ya - Yb = 0$
$P = Pa - Pb = +P$
$R = Ya + Yb + Pa + Pb = 0$

21A · · · LENS UNIT
22A · · · FIXED MEMBER
28 · · · FIRST DETECTION UNIT
29 · · · SECOND DETECTION UNIT
30 · · · FIRST DRIVE UNIT
31 · · · SECOND DRIVE UNIT $Y = Ya - Yb = +Y$
$P = Pa - Pb = +P$
$R = Ya + Yb + Pa + Pb = 0$

21A ··· LENS UNIT
22A ··· FIXED MEMBER
28  ··· FIRST DETECTION UNIT
29  ··· SECOND DETECTION UNIT
30  ··· FIRST DRIVE UNIT
31  ··· SECOND DRIVE UNIT $Y = Ya - Yb = 0$
$P = Pa - Pb = 0$
$R = Ya + Yb + Pa + Pb = +R$

21A · · · LENS UNIT
22A · · · FIXED MEMBER
28 · · · FIRST DETECTION UNIT
29 · · · SECOND DETECTION UNIT
30 · · · FIRST DRIVE UNIT
31 · · · SECOND DRIVE UNIT $Y = Ya - Yb = +Y$
$P = Pa - Pb = +P$
$R = Ya + Yb + Pa + Pb = +R$

21A · · · LENS UNIT
22A · · · FIXED MEMBER
28 · · · FIRST DETECTION UNIT
29 · · · SECOND DETECTION UNIT
30 · · · FIRST DRIVE UNIT
31 · · · SECOND DRIVE UNIT

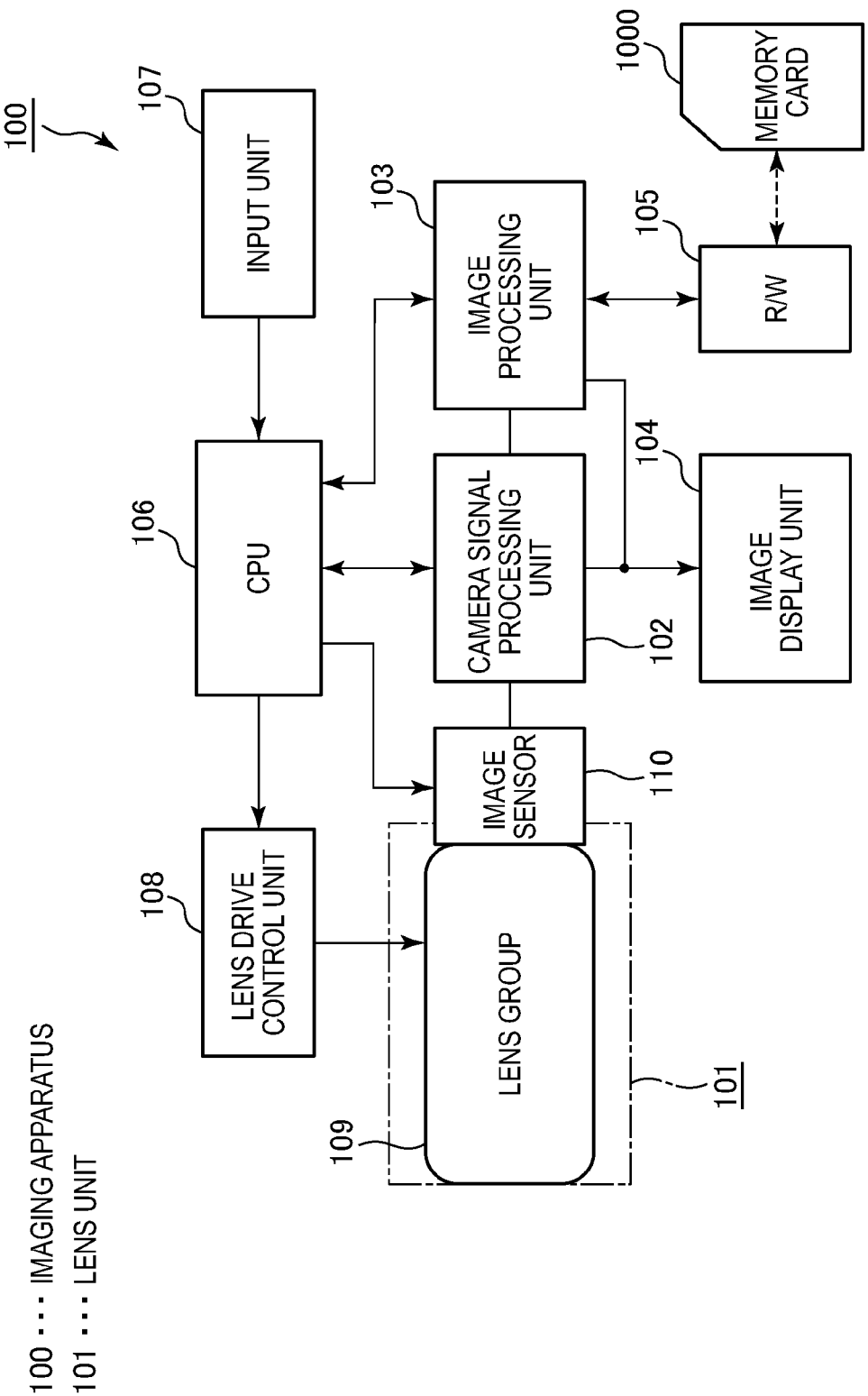

IMAGE BLUR CORRECTION APPARATUS AND IMAGING APPARATUS

BACKGROUND

The present technology relates to a technical field regarding image blur correction apparatuses and imaging apparatuses. More specifically, the present technology relates to a technical field for improving the position detection accuracy of a lens unit by positioning a pair of thrust generation portions and a pair of detection units on opposite sides sandwiching a supporting axis, respectively, so that the position of the lens unit is detected based on a combined output of the pair of detection units.

In an imaging apparatus such as a video camera and a still camera, an image blur correction apparatus may be provided for correcting image blur by moving a lens in a direction orthogonal to the light axis direction.

The image blur correction apparatus provided in such an imaging apparatus may be configured so that a lens unit, which has a lens, turns in a first direction about a first supporting axis that is orthogonal to the light axis of the lens with respect to an outer housing, and in a second direction that is a direction about a second supporting axis orthogonal to the light axis and the first supporting axis (e.g., refer to JP H7-274056A).

Image blur correction is performed by the lens unit, which is provided as a turnable unit, being turned with respect to the fixed member in a yaw direction about the first supporting axis and in a pitch direction about the second supporting axis.

SUMMARY

However, in the image blur correction apparatus described in JP H7-274056A, to correct image blur, the position of the lens unit in the yaw direction and the pitch direction has to be correctly detected, and an appropriate blur correction amount for each direction has to be calculated. Position detection is carried out by detecting the relative positions of a position detection portion provided on either a turnable unit or a fixed member and a detection target portion provided on the other of those.

However, during image capture, since the position direction of the lens unit with respect to a reference position is simultaneously carried out separately in both the yaw direction and the pitch direction, when the lens unit is turned in either the yaw direction or the pitch direction, the position detection in the other direction can be affected.

For example, when the lens unit is turned in the yaw direction, since the position detection portion and a part of the detection target portion are displaced in conjunction with the lens unit, this means that position detection in the pitch direction of the lens unit is carried out in a state in which the relative position of the two portions has changed. Consequently, the turning of the lens unit in the yaw direction can cause a deterioration in the position detection accuracy in the pitch direction.

Conversely, when the lens unit is turned in the pitch direction too, since the position detection portion and a part of the detection target portion are displaced in conjunction with the lens unit, this means that position detection in the yaw direction of the lens unit is carried out in a state in which the relative position of the two portions has changed. Consequently, the turning of the lens unit in the pitch direction can cause a deterioration in the position detection accuracy in the yaw direction.

Accordingly, there is a need for an image blur correction apparatus and an imaging apparatus to prevent the turning of the lens unit in either of a first direction or a second direction having an effect on position detection in the other direction to improve the position detection accuracy of the lens unit.

According to a first embodiment of the present disclosure, it is preferable that there is provided an image blur correction apparatus including a lens unit configured include at least one lens, and configured to be turnable in a first direction which is a direction about a first supporting axis that is orthogonal to a light axis of the lens with respect to an outer housing, and in a second direction which is a direction about a second supporting axis that is orthogonal to the light axis and the first supporting axis, a fixed member configured to turnably support the lens unit in the first direction and the second direction, a first drive unit configured to include a pair of first thrust generation units that applies thrust that turns the lens unit in the first direction and that is positioned on opposite sides sandwiching one of the first supporting axis and the second supporting axis, a second drive unit configured to include a pair of second thrust generation units that applies thrust that turns the lens unit in the second direction and that is positioned on opposite sides sandwiching another of the first supporting axis and the second supporting axis, a pair of first detection units configured to be positioned on opposite sides sandwiching one of the first supporting axis and the second supporting axis, and a pair of second detection units configured to be positioned on opposite sides sandwiching another of the first supporting axis and the second supporting axis. A position in the first direction of the lens unit is detected based on a combined output of the pair of first detection units. A position in the second direction of the lens unit is detected based on a combined output of the pair of second detection units.

Therefore, in the image blur correction apparatus, during turning of the lens unit, the pair of first thrust generation portions, the pair of second thrust generation portions, the pair of first detection units, and the pair of second detection units are each displaced in a symmetrical state about the first supporting axis or the second supporting axis.

According to a second embodiment of the present disclosure, as for the blur correction apparatus, it is preferable that the pair of first thrust generation units may be positioned on opposite sides sandwiching the second supporting axis. The pair of second thrust generation units may be positioned on opposite sides sandwiching the first supporting axis. The pair of first detection units may be positioned on opposite sides sandwiching the second supporting axis. The pair of second detection units may be positioned on opposite sides sandwiching the first supporting axis.

By positioning a pair of first thrust generation portions on opposite sides sandwiching the second supporting axis, positioning a pair of second thrust generation portions on opposite sides sandwiching the first supporting axis, positioning a pair of first detection units on opposite sides sandwiching the second supporting axis, and positioning a pair of second detection units on opposite sides sandwiching the first supporting axis, when the lens unit has been turned in either of the first direction or the second direction, an effect on the position detection accuracy of the lens unit in the other of the first direction or the second direction can be avoided.

According to a third embodiment of the present disclosure, as for the blur correction apparatus, it is preferable that the pair of first thrust generation units may be positioned on opposite sides sandwiching the first supporting axis. The pair of second thrust generation units may be positioned on opposite sides sandwiching the second supporting axis. The pair of first detection units may be positioned on opposite sides sandwiching the first supporting axis. The pair of second detection units may be positioned on opposite sides sandwiching the second supporting axis.

By positioning a pair of first thrust generation portions on opposite sides sandwiching the first supporting axis, positioning a pair of second thrust generation portions on opposite sides sandwiching the second supporting axis, positioning a pair of first detection units on opposite sides sandwiching the first supporting axis, and positioning a pair of second detection units on opposite sides sandwiching the second supporting axis, when the lens unit has been turned in either of the first direction or the second direction, an effect on the position detection accuracy of the lens unit in the other of the first direction or the second direction can be avoided.

According to a fourth embodiment of the present disclosure, as for the blur correction apparatus, it is preferable that the first drive unit and the second drive unit may be provided on an outer periphery side of the lens unit.

By providing the first drive unit and the second drive unit on an outer periphery side of the lens unit, the first drive unit and the second drive unit are not present in the light axis direction.

According to a fifth embodiment of the present disclosure, as for the blur correction apparatus, it is preferable that the first drive unit and the second drive unit may be provided on an outer face side of the lens unit in a light axis direction.

By providing the first drive unit and the second drive unit on an outer face side of the lens unit in a light axis direction, the first drive unit and the second drive unit are not present in the light axis direction.

According to a sixth embodiment of the present disclosure, as for the blur correction apparatus, it is preferable that the lens unit may be provided thereon with a main body that includes the lens and a support member that turnably supports the main body in a direction about the light axis. The main body may be able to turn in the direction about the light axis.

By providing in the lens unit a main body having a lens and a support member configured to turnably support the main body in the direction about the light axis, configuring so that the main body is capable of turning in the direction about the light axis, the main body is turned in the direction about the light axis with respect to the support member.

According to a seventh embodiment of the present disclosure, as for the blur correction apparatus, it is preferable that a turning actuator may be configured from the first drive unit and the second drive unit. The main body may be configured to be turned in the direction about the light axis by the turning actuator.

By configuring a turning actuator from the first drive unit and the second drive unit, and configuring so that the main body is turned in the direction about the light axis by the turning actuator, a dedicated drive unit for turning the main body in the direction about the light axis is not necessary.

According to an eighth embodiment of the present disclosure, it is preferable that there is provided an imaging apparatus including an image blur correction apparatus configured to include a lens unit that includes at least one lens and an outer housing that has the lens unit arranged therein. The lens unit is configured to correct image blur by turning in a first direction which is a direction about a first supporting axis that is orthogonal to a light axis of the lens with respect to the outer housing, and in a second direction about a second supporting axis which is orthogonal to the light axis and the first supporting axis. The image blur correction apparatus includes a fixed member configured to turnably support the lens unit in the first direction and the second direction, a first drive unit configured to include a pair of first thrust generation units that applies thrust that turns the lens unit in the first direction and that is positioned on opposite sides sandwiching one of the first supporting axis and the second supporting axis, a second drive unit configured to include a pair of second thrust generation units that applies thrust that turns the lens unit in the second direction and that is positioned on opposite sides sandwiching another of the first supporting axis and the second supporting axis, a pair of first detection units configured to be positioned on opposite sides sandwiching one of the first supporting axis and the second supporting axis, and a pair of second detection units configured to be positioned on opposite sides sandwiching another of the first supporting axis and the second supporting axis. A position in the first direction of the lens unit is detected based on a combined output of the pair of first detection units. A position in the second direction of the lens unit is detected based on a combined output of the pair of second detection units.

Therefore, for the imaging apparatus, in the image blur correction apparatus, during turning of the lens unit, the pair of first thrust generation portions, the pair of second thrust generation portions, the pair of first detection units, and the pair of second detection units are each displaced in a symmetrical state about the first supporting axis or the second supporting axis.

According to an embodiment of the present disclosure, there is provided an image blur correction apparatus including a lens unit configured include at least one lens, and configured to be turnable in a first direction which is a direction about a first supporting axis that is orthogonal to a light axis of the lens with respect to an outer housing, and in a second direction which is a direction about a second supporting axis that is orthogonal to the light axis and the first supporting axis, a fixed member configured to turnably support the lens unit in the first direction and the second direction, a first drive unit configured to include a pair of first thrust generation units that applies thrust that turns the lens unit in the first direction and that is positioned on opposite sides sandwiching one of the first supporting axis and the second supporting axis, a second drive unit configured to include a pair of second thrust generation units that applies thrust that turns the lens unit in the second direction and that is positioned on opposite sides sandwiching another of the first supporting axis and the second supporting axis, a pair of first detection units configured to be positioned on opposite sides sandwiching one of the first supporting axis and the second supporting axis, and a pair of second detection units configured to be positioned on opposite sides sandwiching another of the first supporting axis and the second supporting axis. A position in the first direction of the lens unit is detected based on a combined output of the pair of first detection units. A position in the second direction of the lens unit is detected based on a combined output of the pair of second detection units.

Therefore, when the lens unit has been turned in either of the first direction or the second direction, there is no effect on position detection of the lens unit in the other of the first direction or the second direction, so that the position detection accuracy of the lens unit can be improved.

According to a second embodiment of the present disclosure, the pair of first thrust generation units may be positioned on opposite sides sandwiching the second supporting axis. The pair of second thrust generation units may positioned on opposite sides sandwiching the first supporting axis. The pair of first detection units may be positioned on opposite sides sandwiching the second supporting axis. The pair of second detection units may be positioned on opposite sides sandwiching the first supporting axis.

Therefore, when the lens unit has been turned in either of the first direction or the second direction, an effect on the position detection accuracy of the lens unit in the other of the first direction or the second direction can be avoided, so that the position detection accuracy of the lens unit can be improved by a simple configuration.

According to a third embodiment of the present disclosure, the pair of first thrust generation units may be positioned on opposite sides sandwiching the first supporting axis. The pair of second thrust generation units may be positioned on opposite sides sandwiching the second supporting axis. The pair of first detection units may be positioned on opposite sides sandwiching the first supporting axis. The pair of second detection units may be positioned on opposite sides sandwiching the second supporting axis.

Therefore, when the lens unit has been turned in either of the first direction or the second direction, an effect on the position detection accuracy of the lens unit in the other of the first direction or the second direction can be avoided, so that the position detection accuracy of the lens unit can be improved by a simple configuration.

According to a fourth embodiment of the present disclosure, the first drive unit and the second drive unit may be provided on an outer periphery side of the lens unit.

Therefore, the position detection accuracy of the lens unit can be improved while also achieving a reduction in size in the light axis direction.

According to a fifth embodiment of the present disclosure, the first drive unit and the second drive unit may be provided on an outer face side of the lens unit in a light axis direction.

Therefore, the position detection accuracy of the lens unit can be improved while also achieving a reduction in size in the direction orthogonal to the light axis.

According to a sixth embodiment of the present disclosure, the lens unit may be provided thereon with a main body that includes the lens and a support member that turnably supports the main body in a direction about the light axis. The main body may be able to turn in the direction about the light axis.

Therefore, the lens unit can also be turned in the direction about the light axis, so that a blur correction operation can also be performed in the direction about the light axis, thereby enabling a substantial improvement in image quality to be achieved.

According to a seventh embodiment of the present disclosure, a turning actuator may be configured from the first drive unit and the second drive unit. The main body may be configured to be turned in the direction about the light axis by the turning actuator.

Therefore, a dedicated drive unit for turning the main body unit in the direction about the light axis is not necessary, so that the configuration of the lens unit can be made simpler and more compact due to a reduction in the number of parts and necessary space.

According to an eighth embodiment of the present embodiment, there is provided an imaging apparatus including an image blur correction apparatus configured to include a lens unit that includes at least one lens and an outer housing that has the lens unit arranged therein. The lens unit is configured to correct image blur by turning in a first direction which is a direction about a first supporting axis that is orthogonal to a light axis of the lens with respect to the outer housing, and in a second direction about a second supporting axis which is orthogonal to the light axis and the first supporting axis. The image blur correction apparatus includes a fixed member configured to turnably support the lens unit in the first direction and the second direction, a first drive unit configured to include a pair of first thrust generation units that applies thrust that turns the lens unit in the first direction and that is positioned on opposite sides sandwiching one of the first supporting axis and the second supporting axis, a second drive unit configured to include a pair of second thrust generation units that applies thrust that turns the lens unit in the second direction and that is positioned on opposite sides sandwiching another of the first supporting axis and the second supporting axis, a pair of first detection units configured to be positioned on opposite sides sandwiching one of the first supporting axis and the second supporting axis, and a pair of second detection units configured to be positioned on opposite sides sandwiching another of the first supporting axis and the second supporting axis. A position in the first direction of the lens unit is detected based on a combined output of the pair of first detection units. A position in the second direction of the lens unit is detected based on a combined output of the pair of second detection units.

Therefore, in the image blur correction apparatus, when the lens unit has been turned in either of the first direction or the second direction, there is no effect on position detection of the lens unit in the other of the first direction or the second direction, so that the position detection accuracy of the lens unit can be improved.

BRIEF DESCRIPTION OF THE DRAWINGS

FIG. 9 is a diagram illustrating a state in which a lens unit has been turned in a first direction and a second direction;

FIG. 21 illustrates a state in which a lens unit has been turned in a first direction and a second direction;

FIG. 30 is a block diagram of an imaging apparatus.

DETAILED DESCRIPTION OF THE EMBODIMENT(S)

Figure 1:
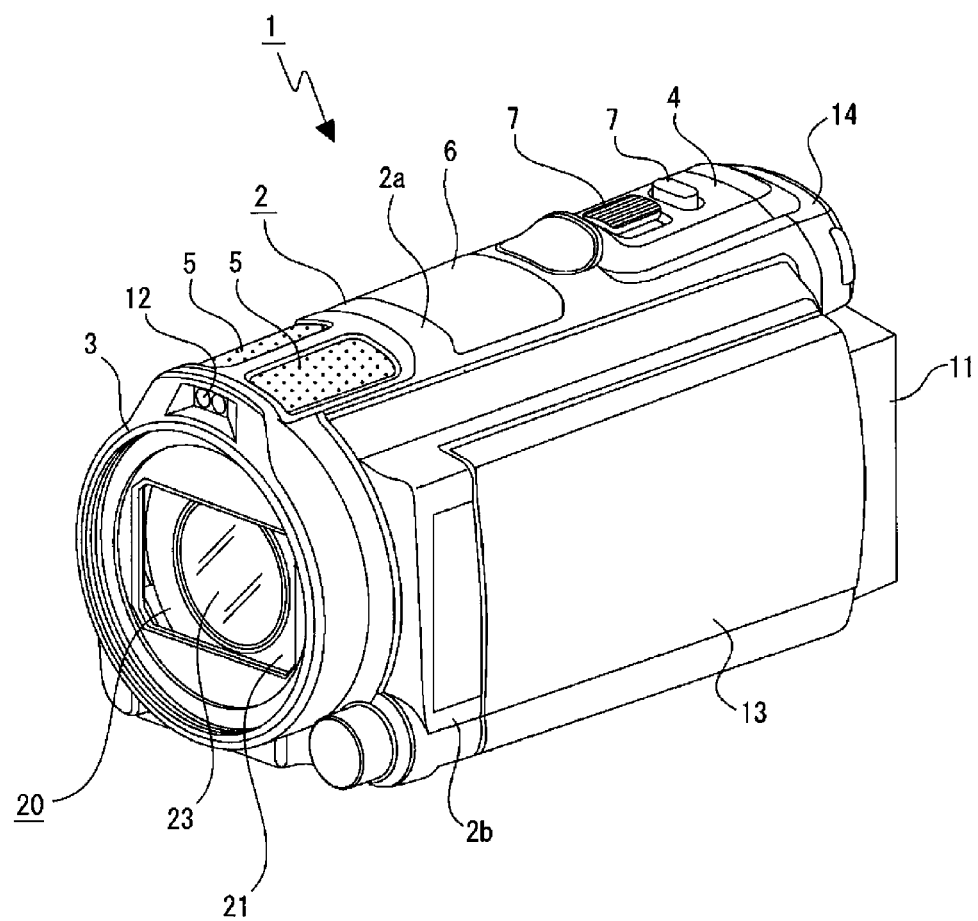
FIG. 1, which along with FIGS. 2 to 30 illustrates an image blur correction apparatus and an imaging apparatus according to an embodiment of the present technology, is a perspective view of an imaging apparatus.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

A best mode for implementing out the image blur correction apparatus and imaging apparatus according to an embodiment of the present technology will now be described with reference to the attached drawings.

The below-illustrated best mode applies the imaging apparatus according to an embodiment of the present technology in a video camera, and applies the image blur correction apparatus according to an embodiment of the present technology as an image blur correction apparatus provided in this video camera.

The applicable scope of the imaging apparatus and image blur correction apparatus according to an embodiment of the present technology is not limited, respectively, to a video camera and an image blur correction apparatus provided in a video camera. The imaging apparatus and image blur correction apparatus according to an embodiment of the present technology can be widely applied as an imaging apparatus incorporated in various devices, for example, a still camera, a mobile telephones, a personal computer and the like, or as an image blur correction apparatus provided in such an imaging apparatus.

In the following description, the front/rear, up/down (hereinafter "vertical"), and left/right (hereinafter, "horizontal") directions represent the directions as seen by the photographer when capturing an image with the video camera. Therefore, the object side becomes the front, and the photographer's side becomes the rear.

It is noted that the front/rear, vertical, and horizontal directions mentioned below are to facilitate the description. The present technology is not limited to these directions.

Further, the lens illustrated below can mean either a lens configured from a single lens, or a lens that is configured as a lens group by a plurality of lenses.

[Overall Configuration of the Imaging Apparatus]

Figure 2:
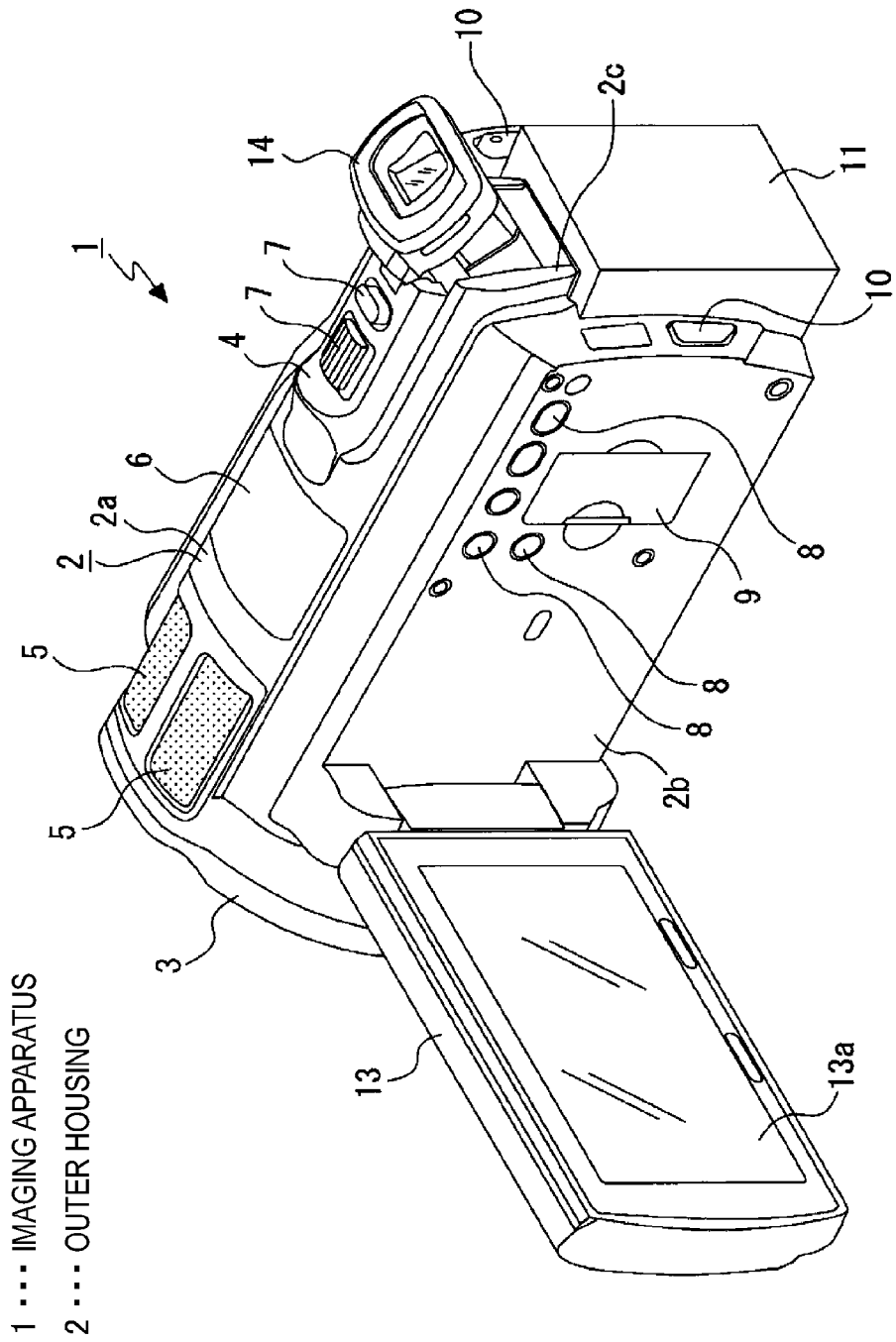
FIG. 2 is a perspective view of an imaging apparatus shown from a different direction from that in FIG. 1.
Figure 3:
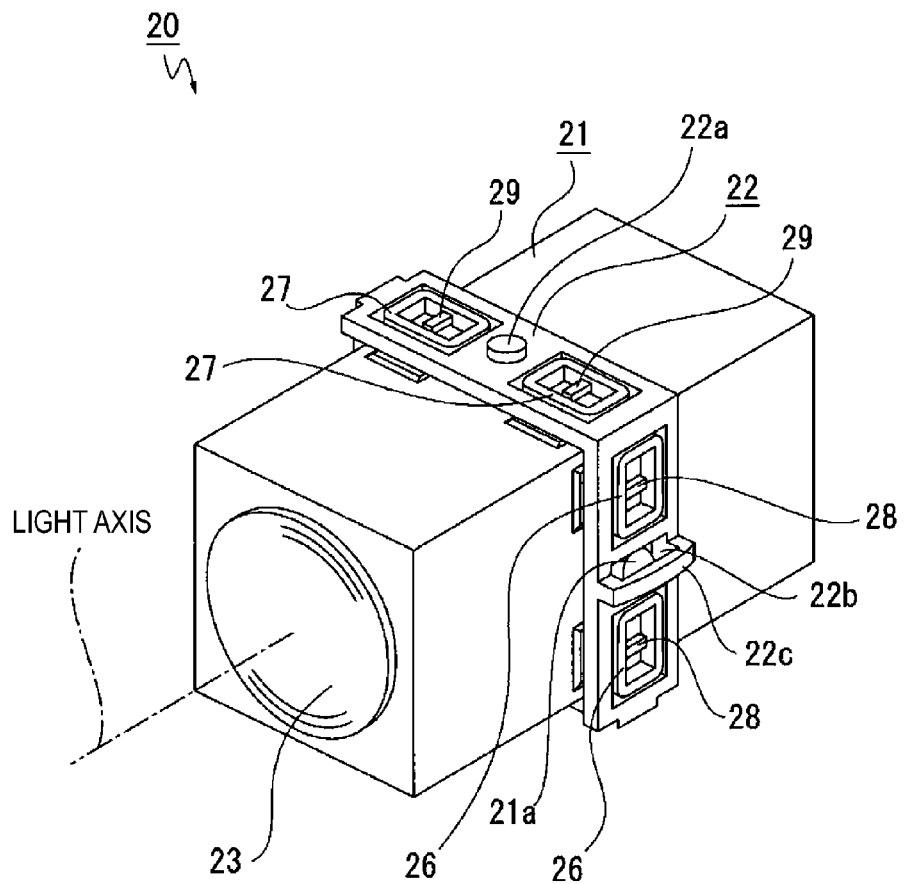
FIG. 3, which along with FIGS. 4 to 21 illustrates an image blur correction apparatus according to a first embodiment of the present technology, is a perspective view of an image blur correction apparatus.
Figure 4:
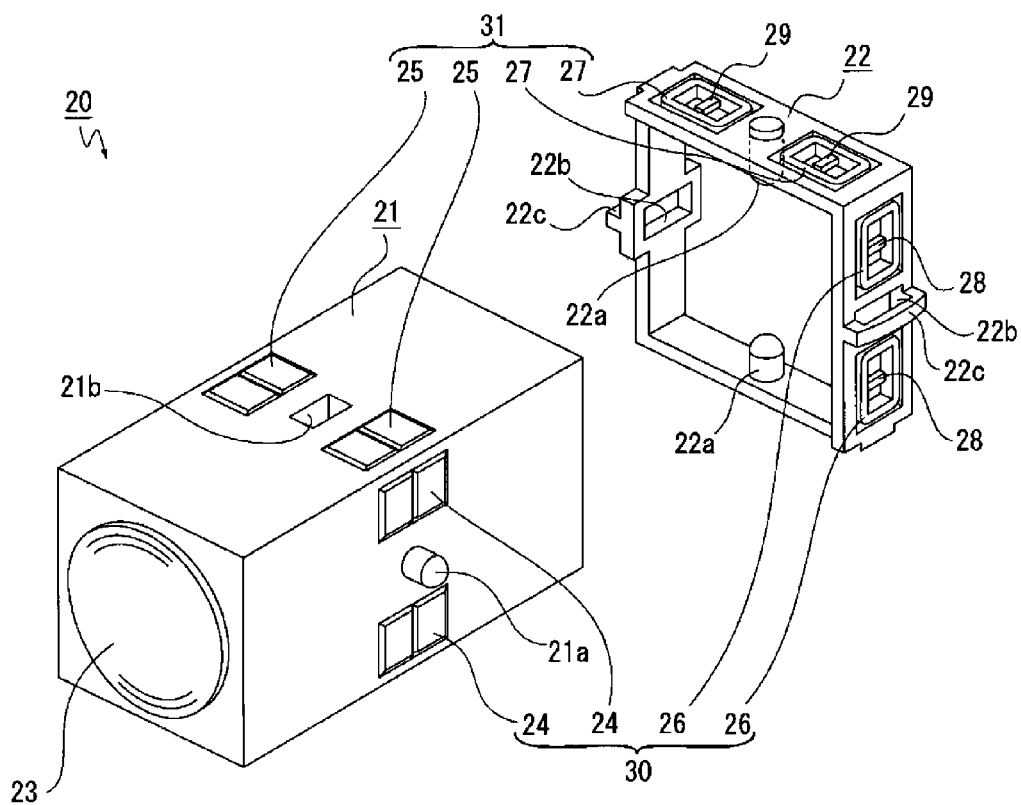
FIG. 4 is an exploded perspective view of an image blur correction apparatus.

An imaging apparatus 1 has various parts arranged in and externally to an outer housing 2 (refer to FIGS. 1 and 2). The outer housing 2 is formed in the shape of a casing that is long in the front/rear direction. A front edge portion is provided as a front panel 3, and an upper edge portion at a rear edge portion is provided as a storage case portion 4 that is open to the rear.

Microphones 5 and 5, an interface cover 6, and operating switches 7 and 7 are arranged in order from the front on an upper face 2a of the outer housing 2. The operating switches 7 and 7 are, for example, a zoom lever and imaging buttons.

Various operating buttons 8, 8 . . . , such as a power button and an image playback button, are arranged on one side face 2b of the outer housing 2. A memory card 9 is mounted on one side face 2b of the outer housing 2.

Operating buttons 10 and 10, such as a mode switching button and a recording button, are arranged on a rear face 2c of the outer housing 2.

A battery 11 is mounted on the rear face of the outer housing 2. A part of the battery 11 protrudes towards the rear from the rear face 2c of the outer housing 2.

A flash 12 is arranged on an upper edge portion of the front panel 3. The flash 12, which is used when capturing images at night, irradiates auxiliary light 12 toward the front.

A display unit 13 is turnably and rotatably attached to a side face portion of the outer housing 2. The front edge portion of the display unit 13 is connected to the outer housing 2. The display unit 13 has a display face 13a.

A finder 14 is attached to a rear edge portion of the imaging apparatus 1. The finder 14 can slide in the front/rear direction and can be turned in a tilt direction with respect to the storage case portion 4.

The finder 14 can slide between a storage position, in which the section excluding the rear edge portion is stored in the storage case portion 4, and a pulled-out position, in which the finder 14 has been pulled out from the storage case portion 4. Further, the finder 14 can be turned in a tilt direction about the front edge portion at the pulled-out position.

[Configuration of the Image Blur Correction Apparatus (First Embodiment)]

An image blur correction apparatus 20 according to a first embodiment of the present technology will now be described (refer to FIGS. 1 to 9).

An image blur correction apparatus 20 is arranged in the outer housing 2 (refer to FIGS. 1 and 2). The image blur correction apparatus 20 has a lens unit 21 and a fixed member 22 that supports the lens unit 21 (refer to FIGS. 3 to 5).

The lens unit 21 is formed in a shape that extends in a light axis direction, for example, a roughly rectangular shape. A plurality of lenses or a lens group arrayed in a light axis direction is provided in the lens unit 21. A lens 23, called a "front lens", is arranged at the front-most side (object side).

In the lens unit 21, first turning shafts 21a and 21a that protrude outwards are provided on the left and right faces, respectively, and first support grooves 21b and 21b that are open outwards are formed on the upper and lower faces, respectively. The first support grooves 21b and 21b are formed in a shape that extends in the front/rear direction.

In the lens unit 21, first drive magnets 24 and 24 are attached to one side face, and second drive magnets 25 and 25 are attached to the upper face, for example. The first drive magnets 24 and 24 are vertically positioned sandwiching a first turning shaft 21a, and are magnetized so that the N pole and the S pole are in the front/rear direction. The second drive magnets 28 and 28 are horizontally positioned sandwiching a first support groove 21b, and are magnetized so that the N pole and the S pole are in the front/rear direction.

The fixed member 22 is formed in a rectangular frame shape, for example. On the fixed member 22, second turning shafts 22a and 22a that protrude inwards are provided on the upper and lower face portions, respectively, and second support grooves 22b and 22b are formed on the left and right face portions passing horizontally therethrough, respectively. The second support grooves 22b and 22b are formed in a shape that extends in the front/rear direction.

On the fixed member 22, first drive coils 26 and 26 are attached to one side face portion, and second drive coils 27 and 27 are attached to an upper face portion, for example. The first drive coils 26 and 26 are vertically positioned sandwiching a second support groove 22b, and the second drive coils 27 and 27 are horizontally positioned sandwiching a first turning shaft 21a.

First detection units 28 and 28 are arranged in a center portion of the first drive coils 26 and 26, respectively, and second detection units 29 and 29 are arranged in a center portion of the second drive coils 27 and 27, respectively. As the first detection units 28 and 28 and the second detection units 29 and 29, a Hall element can be used, for example.

Regulating wall portions 22c and 22c that function as a regulating portion for regulating movement of the lens unit 21 in the light axis direction (front/rear direction) are provided on both the left and right face portions of the fixed member 22, respectively. The regulating wall portions 22c protrude outwards, and are formed in a convex arc shape jutting outwards.

In the thus-configured lens unit 21 and fixed member 22, the first turning shafts 21a and 21a of the lens unit 21 are respectively inserted into the second support grooves 22b and 22b of the fixed member 22, and the second turning shafts 22a and 22a of the fixed member 22 are respectively inserted into the first support grooves 21b and 21b of the lens unit 21, whereby the lens unit 21 is turnably supported on the fixed member 22. At this stage, since the second support grooves 22b and 22b and the first support grooves 21b and 21b are each formed in a shape extending in the front/rear direction, the first turning shafts 21a and 21a can slide along the second support grooves 22b and 22b, respectively, and the second turning shafts 22a and 22a can slide along the first support grooves 21b and 21b, respectively.

The lens unit 21 can be turned with respect to the fixed member 22 in a first direction (yaw direction) about the second turning shafts 22a and 22a, and can be turned in a second direction (pitch direction) about the first turning shafts 21a and 21a. An axis connecting the second turning shafts 22a and 22a is a first supporting axis P that is orthogonal to the light axis (refer to FIG. 5). The lens unit 21 is turned in the first direction, which is the direction about the first supporting axis P. Further, an axis connecting the first turning shafts 21a and 21a is a second supporting axis Q that is orthogonal to the light axis and to the first supporting axis P (refer to FIG. 5). The lens unit 21 is turned in the second direction, which is the direction about the second supporting axis Q.

Figure 5:
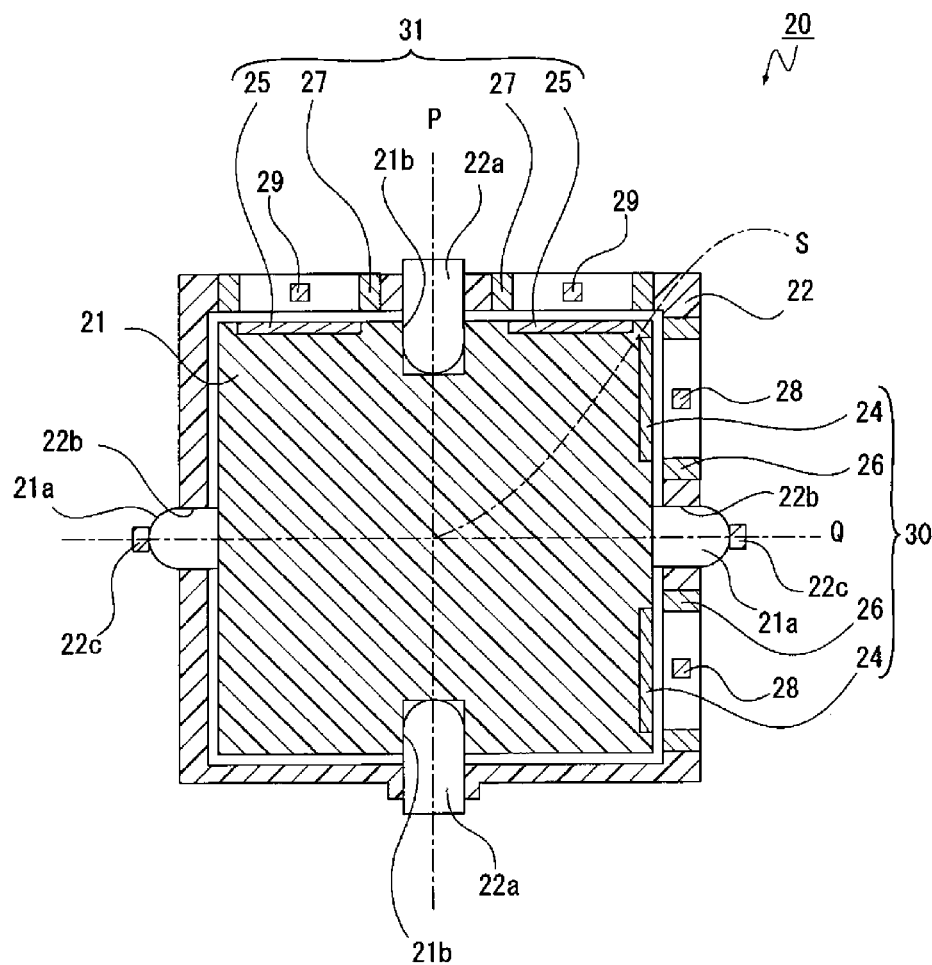
FIG. 5 is an enlarged cross-sectional view of an image blur correction apparatus.
Figure 6:
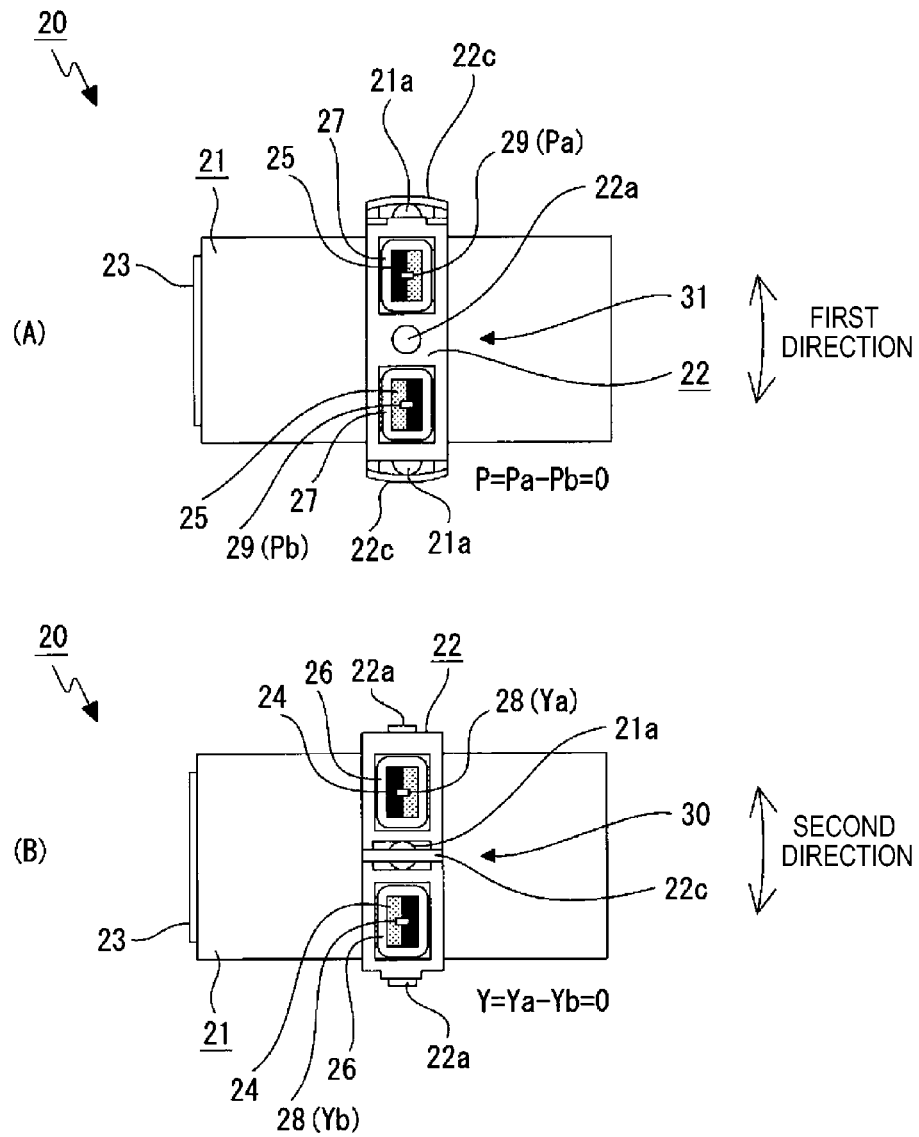
FIG. 6, which along with FIGS. 7 to 9 illustrates operation of an image blur correction apparatus and a first position detection method, is a diagram illustrating a state in which a lens unit is at a reference position.
Figure 7:
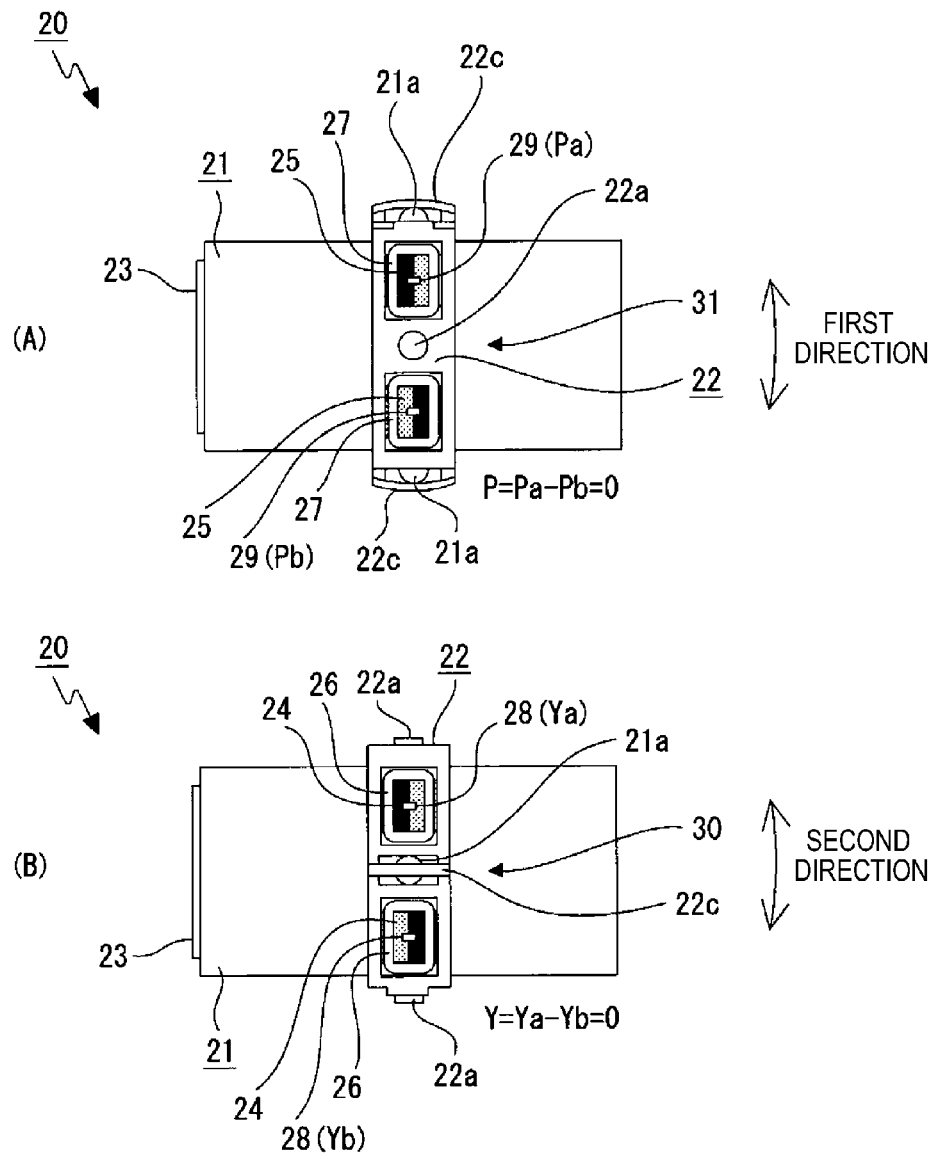
FIG. 7 is a diagram illustrating a state in which a lens unit has been turned in a first direction.
Figure 8:
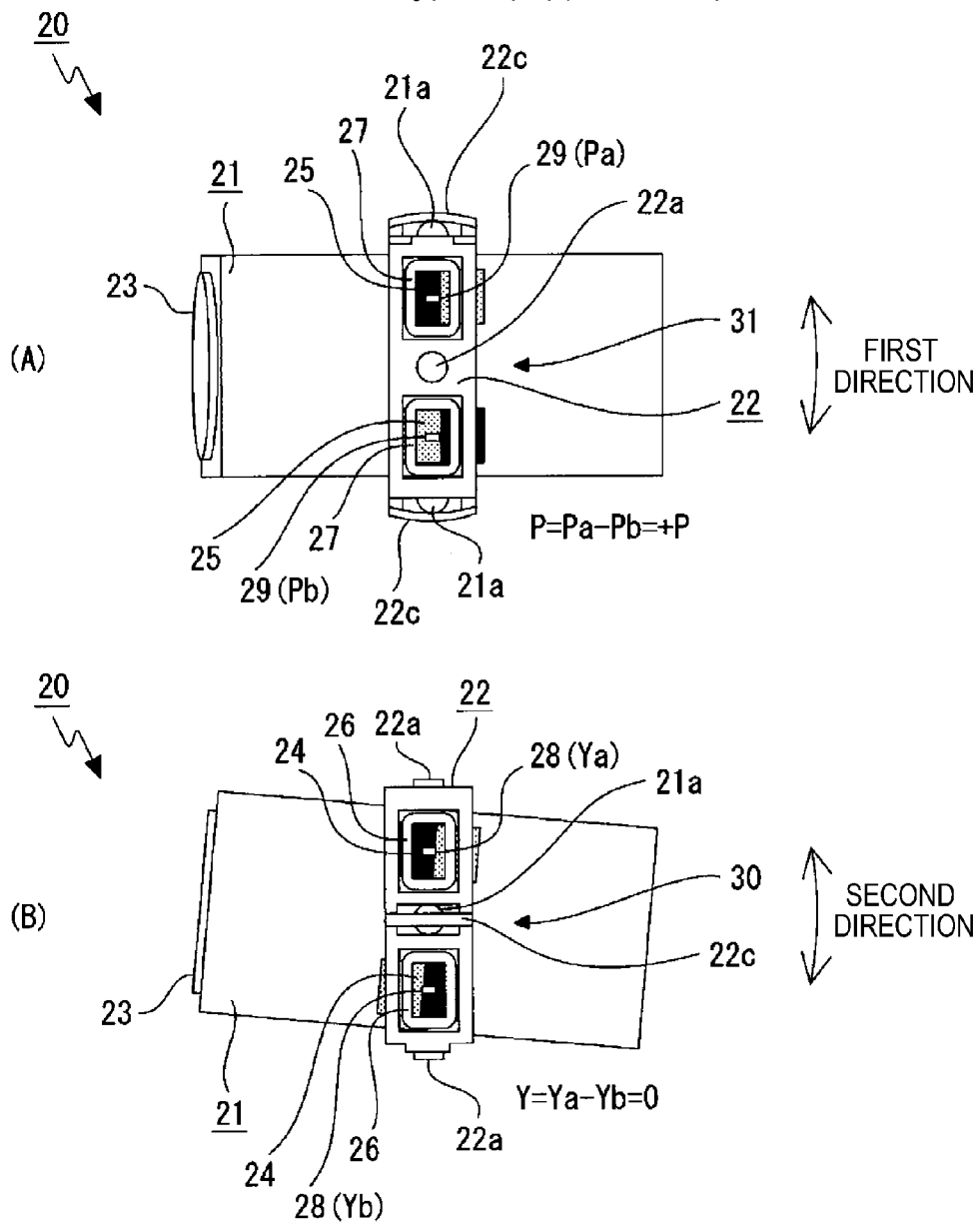
FIG. 8 is a diagram illustrating a state in which a lens unit has been turned in a second direction.
Figure 10:
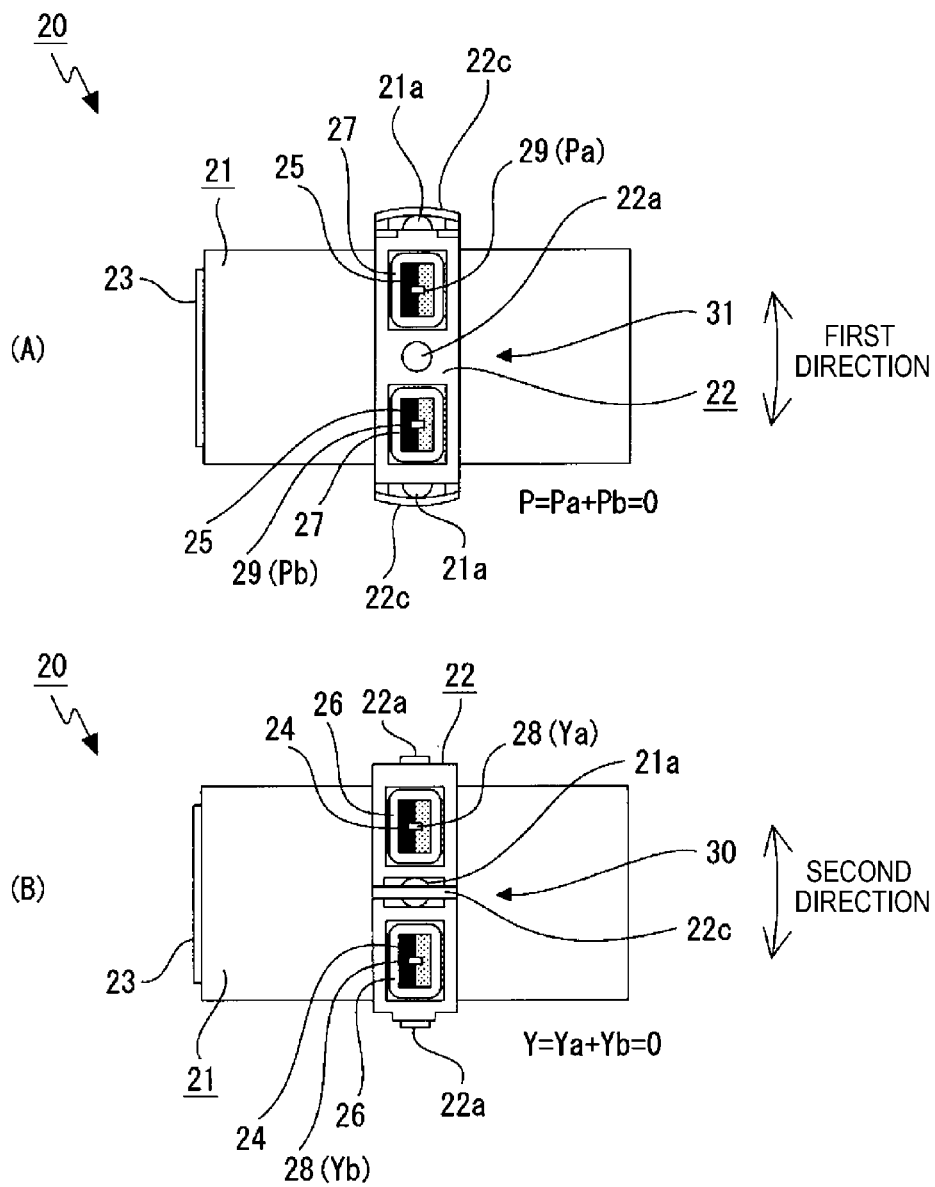
FIG. 10, which along with FIGS. 11 to 13 illustrates a blur correction operation and a second position detection method according to a first embodiment of the present technology, illustrates a state in which a lens unit is at a reference position.
Figure 11:
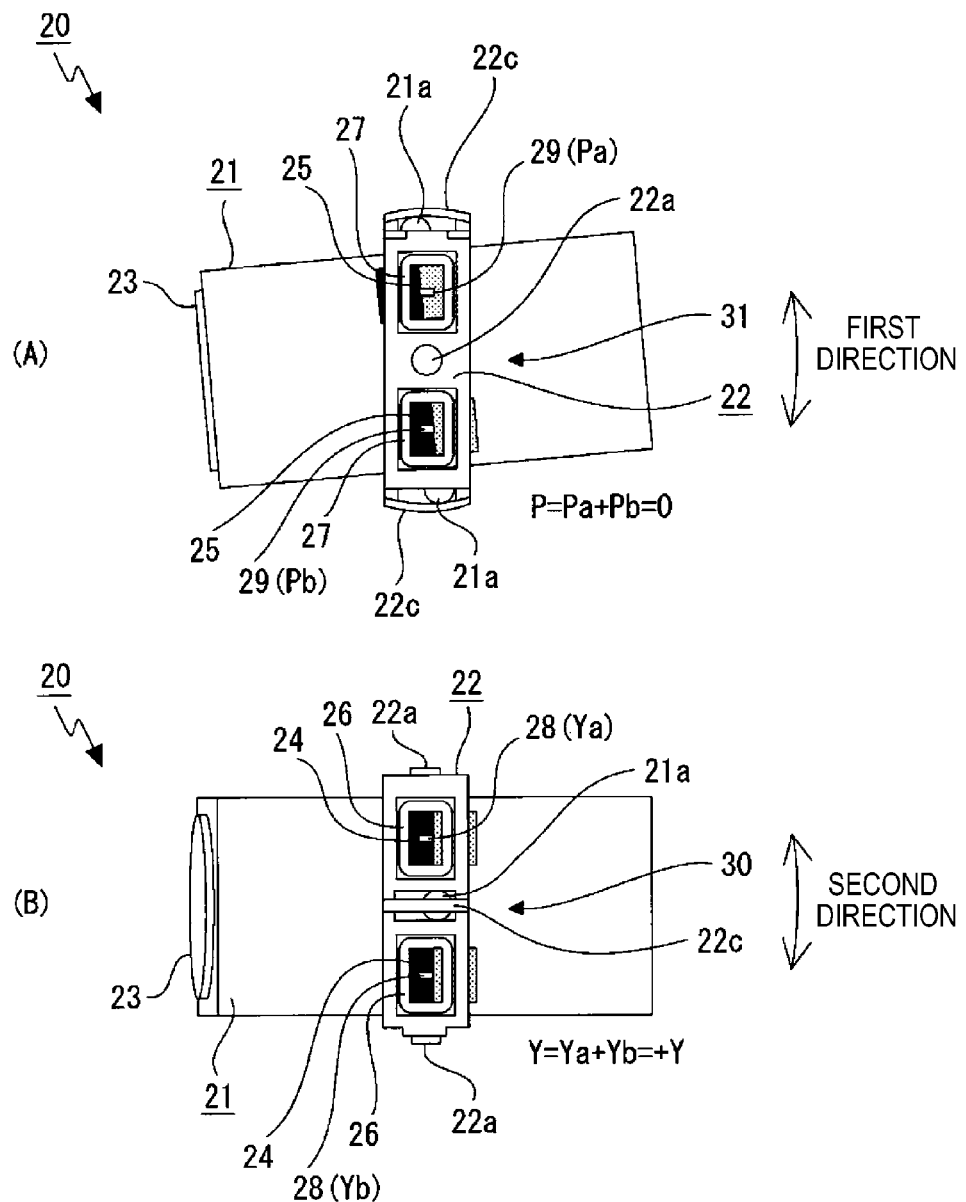
FIG. 11 illustrates a state in which a lens unit has been turned in a first direction.
Figure 12:
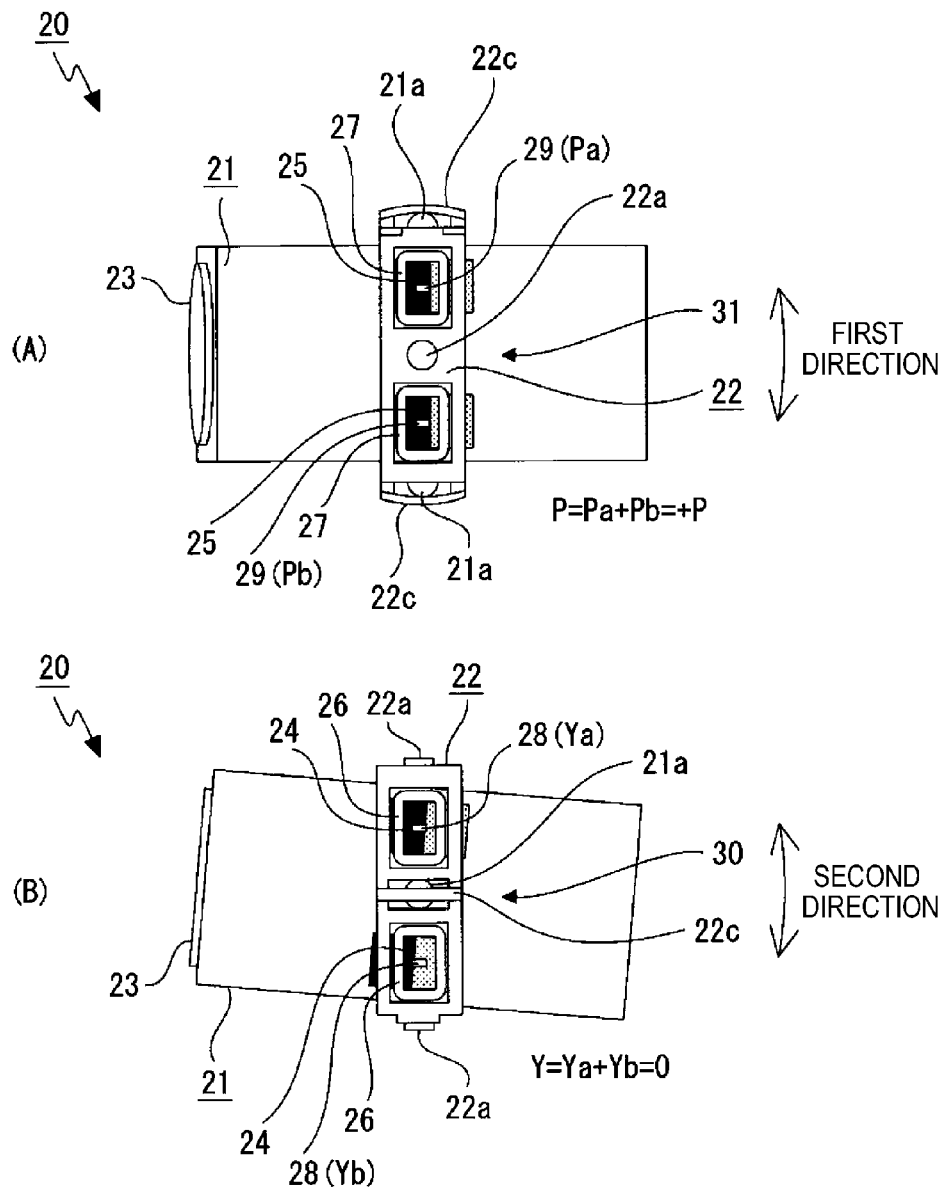
FIG. 12 illustrates a state in which a lens unit has been turned in a second direction.
Figure 13:
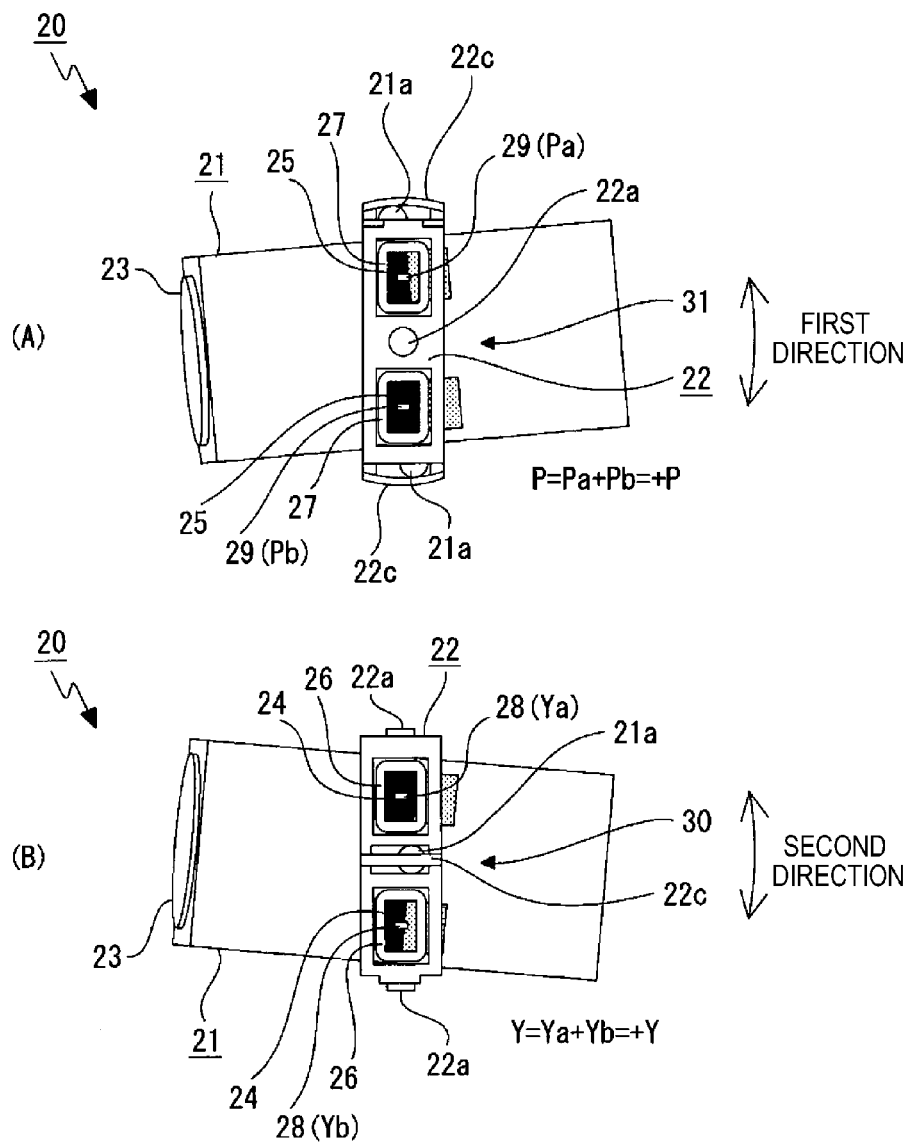
FIG. 13 illustrates a state in which a lens unit has been turned in a first direction and a second direction.
Figure 14:
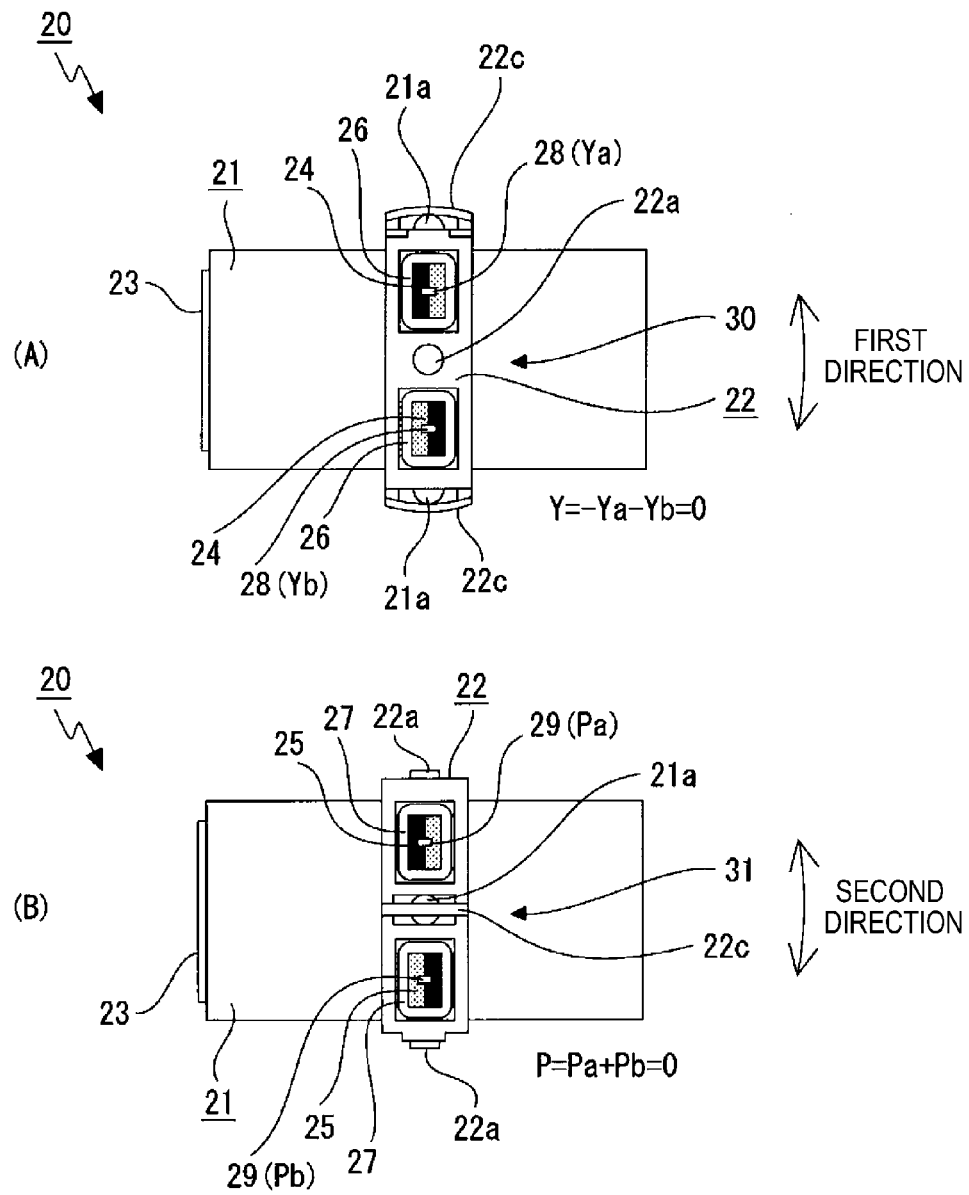
FIG. 14, which along with FIGS. 15 to 17 illustrates a blur correction operation and a third position detection method, illustrates a state in which a lens unit is at a reference position.
Figure 15:
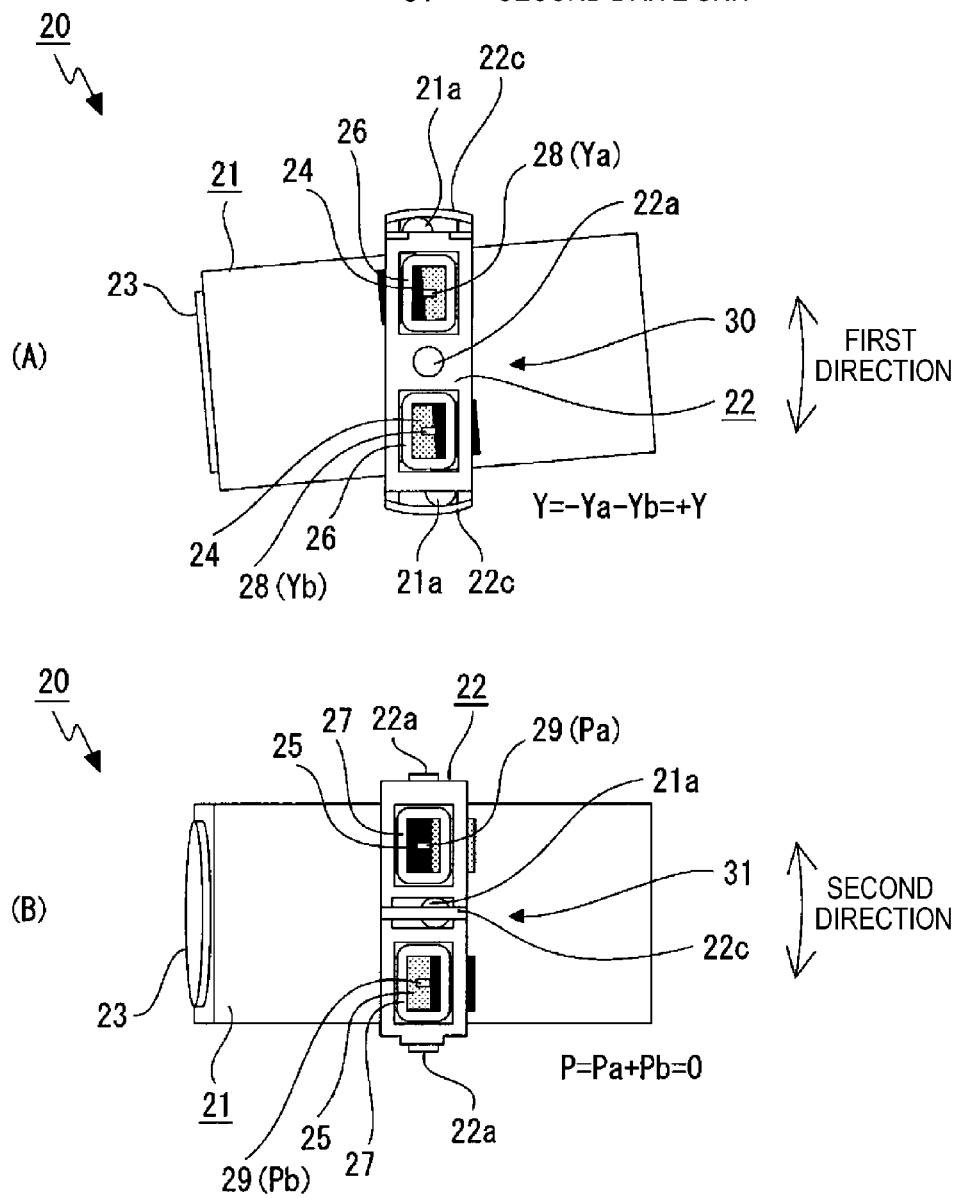
FIG. 15 illustrates a state in which a lens unit has been turned in a first direction.
Figure 16:
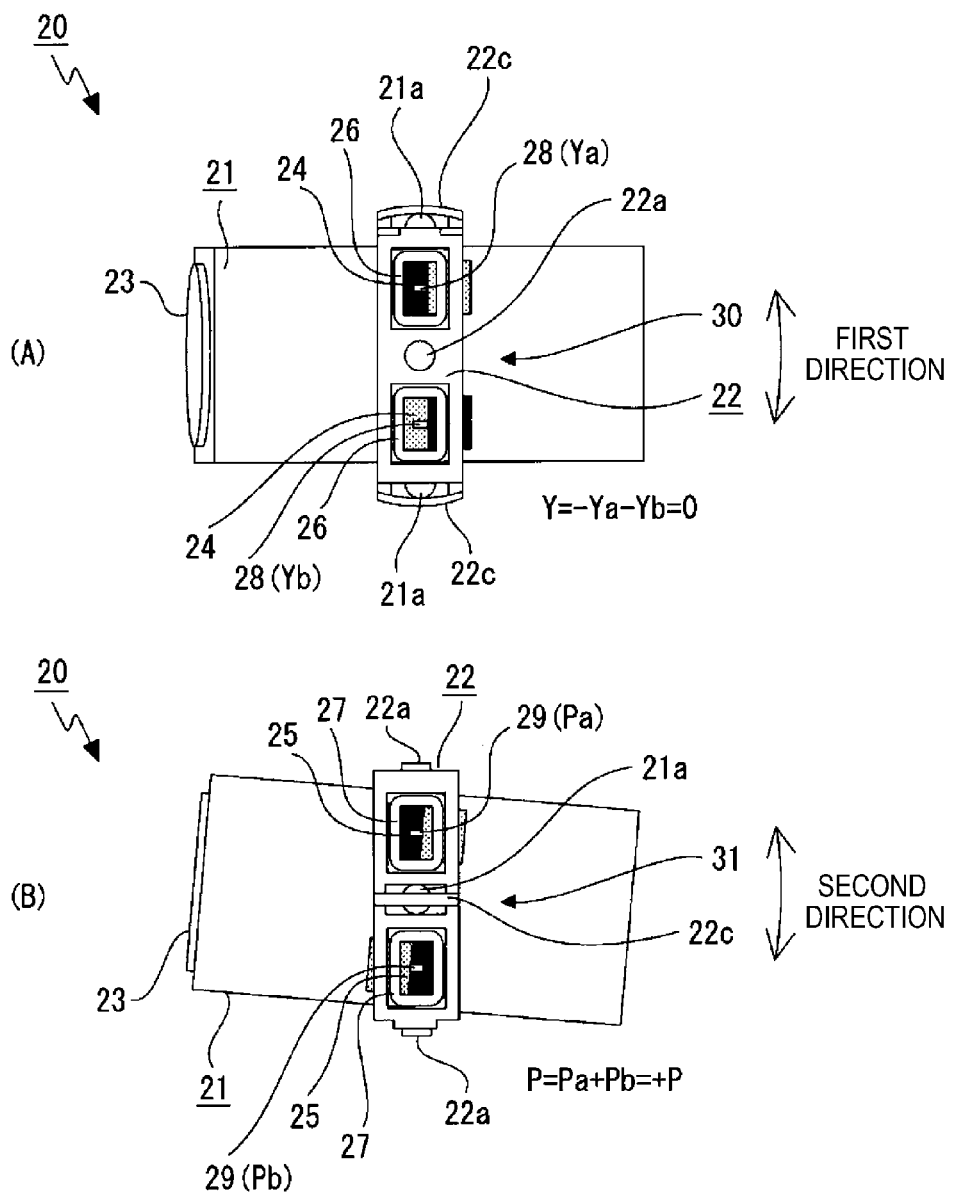
FIG. 16 illustrates a state in which a lens unit has been turned in a second direction.
Figure 17:
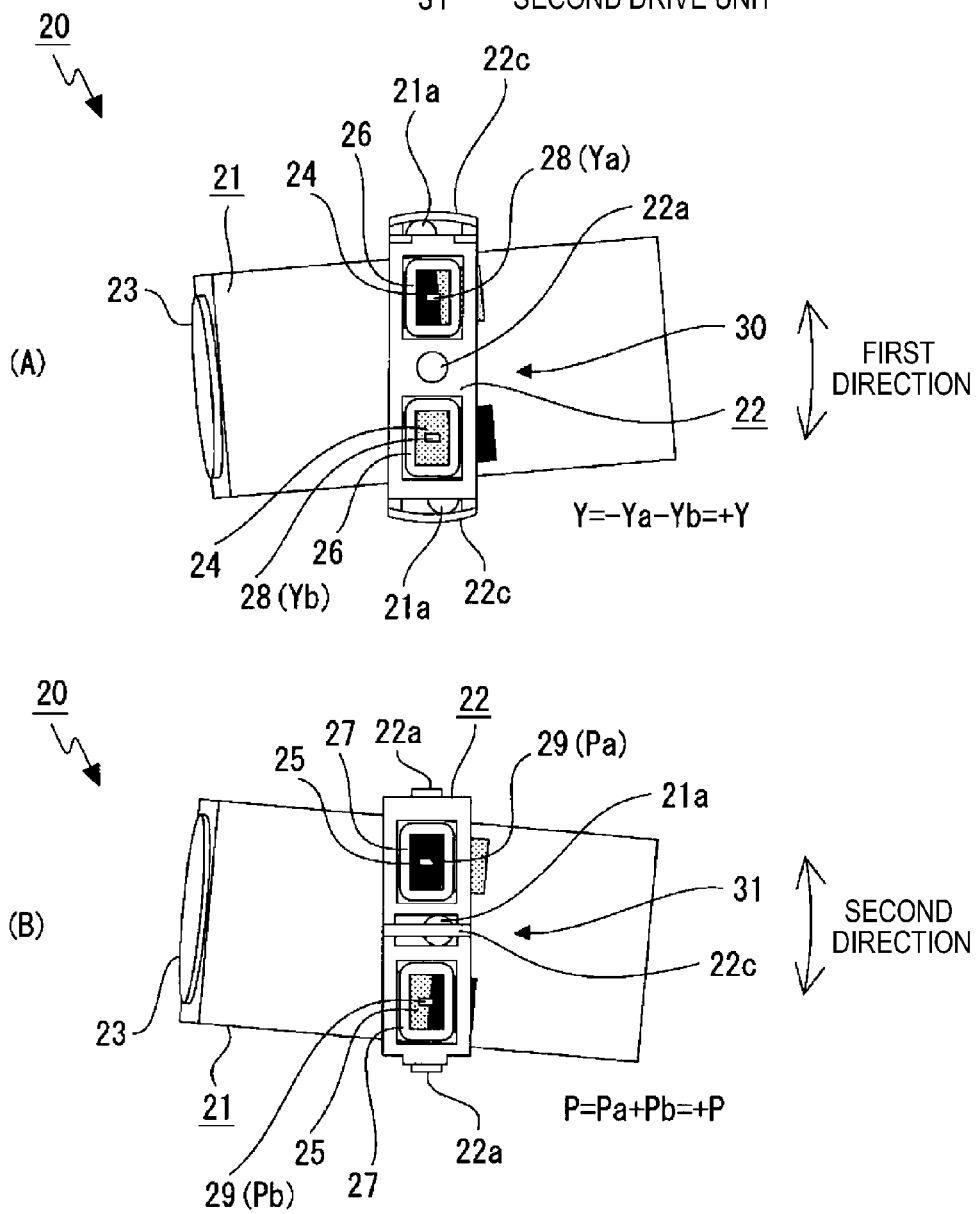
FIG. 17 illustrates a state in which a lens unit has been turned in a first direction and a second direction.
Figure 18:
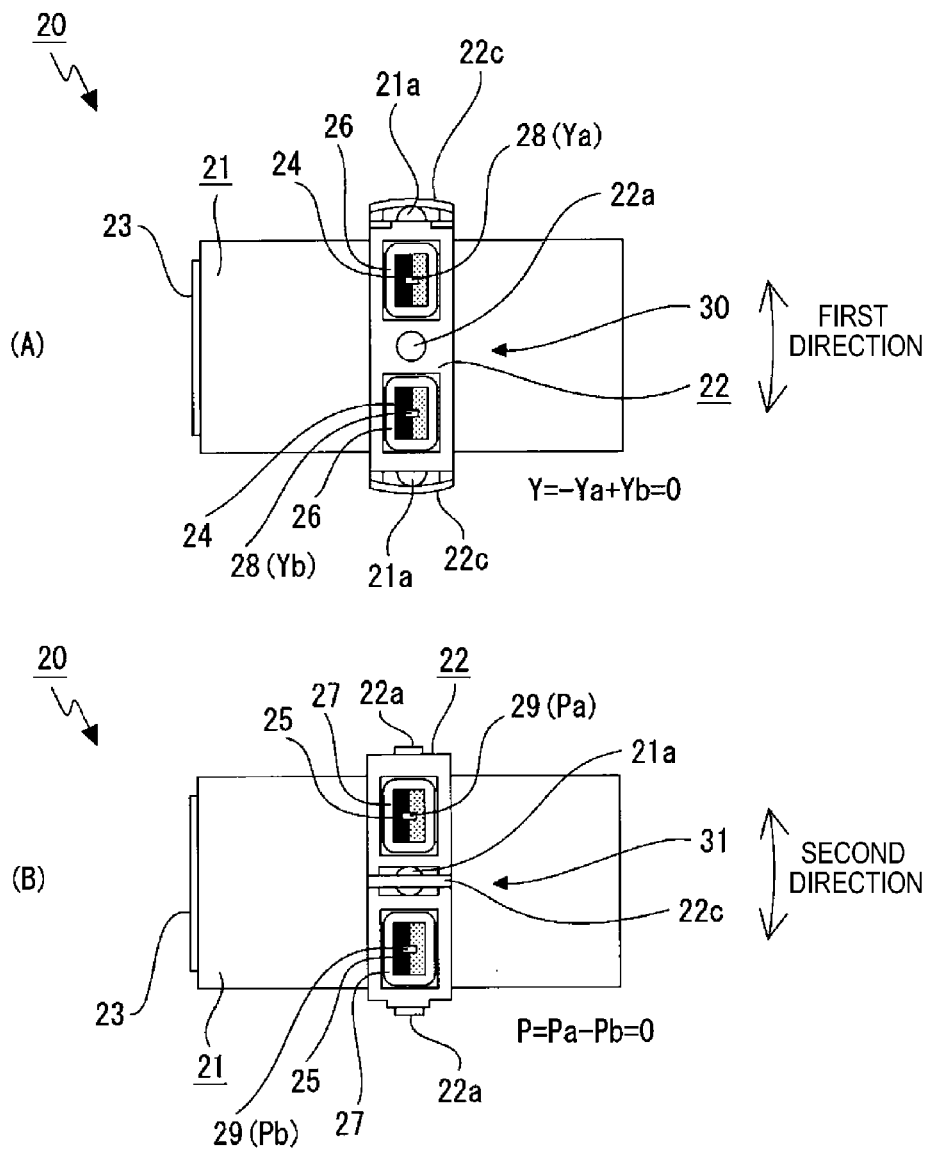
FIG. 18, which along with FIGS. 19 to 21 illustrates a blur correction operation and a fourth position detection method, illustrates a state in which a lens unit is at a reference position.
Figure 19:
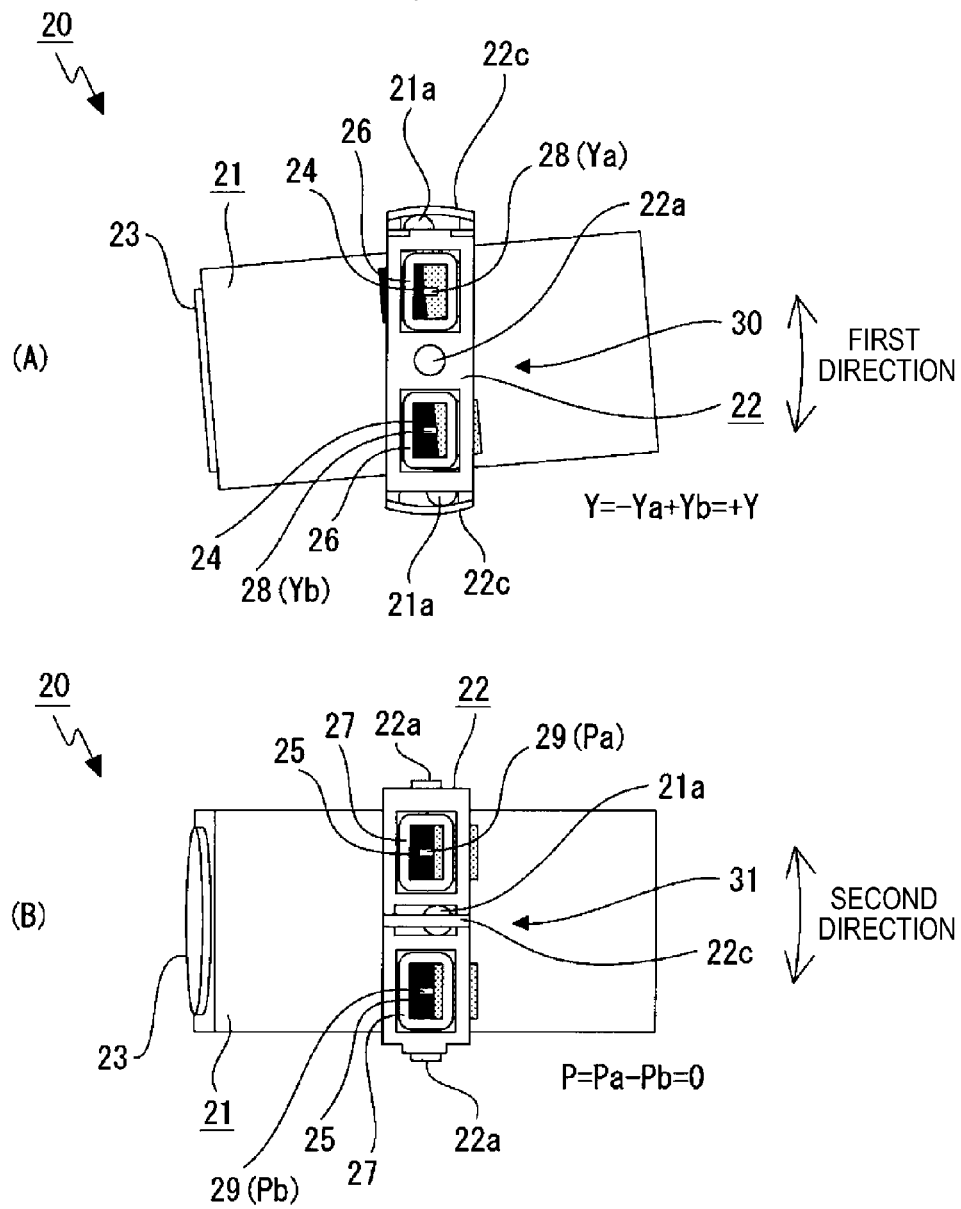
FIG. 19 illustrates a state in which a lens unit has been turned in a first direction.
Figure 20:
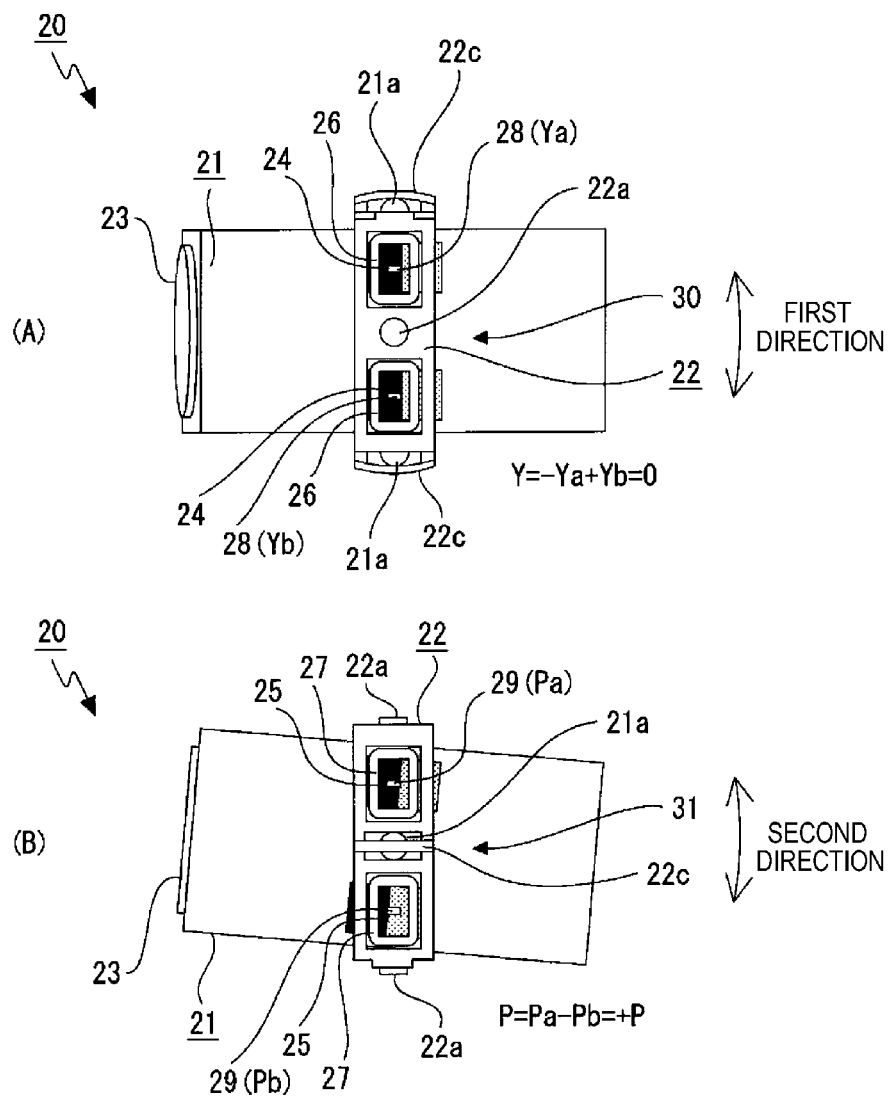
FIG. 20 illustrates a state in which a lens unit has been turned in a second direction.

The regulating wall portions 22c and 22c of the fixed member 22 are, as described above, formed in a convex arc shape jutting outwards, and are an arc shape formed around an intersection S of the first supporting axis P and the second supporting axis Q (refer to FIG. 5). Therefore, when the lens unit 21 turns in the first direction, the tip of the first turning shafts 21a and 21a slides along an inner face of the regulating wall portions 22c and 22c, respectively, so that the lens unit 21 does not move in the light axis direction with respect to the fixed member 22.

The first drive magnets 24 and 24 attached to the lens unit 21 and the first drive coils 26 and 26 attached to the fixed member 22 are respectively positioned facing the horizontal direction. A first drive unit 30 that turns the lens unit 21 in the first direction is configured from the first drive magnets 24 and 24 and the first drive coils 26 and 26. In the first drive unit 30, one of the first drive magnets 24 and one of the first drive coils 26 act as a first thrust generation unit that imparts on the lens unit 21a turning force (thrust) in the first direction. Further, the other first drive magnet 24 and the other first drive coil 26 also act as a first thrust generation unit that imparts on the lens unit 21a turning force (thrust) in the first direction. The pair of first thrust generation units is positioned on opposite sides sandwiching the second supporting axis Q.

On the other hand, the second drive magnets 25 and 25 attached to the lens unit 21 and the second drive coils 27 and 27 attached to the fixed member 22 are respectively positioned facing the vertical direction. A second drive unit 31 that turns the lens unit 21 in the second direction is configured from the second drive magnets 25 and 25 and the second drive coils 27 and 27. In the second drive unit 31, one of the second drive magnets 25 and one of the second drive coils 27 act as a second thrust generation unit that imparts on the lens unit 21a turning force (thrust) in the second direction. Further, the other second drive magnet 25 and the other second drive coil 27 also act as a second thrust generation unit that imparts on the lens unit 21a turning force (thrust) in the second direction. The pair of second thrust generation units is positioned on opposite sides sandwiching the first supporting axis P.

It is noted that an example was described above in which the first drive unit 30 is configured on a side face portion of the lens unit 21 and the fixed member 22, and the second drive unit 31 is configured on the upper face portion of the lens unit 21 and the fixed member 22. However, conversely, the second drive unit for turning the lens unit 21 in the second direction may be configured on a side face portion of the lens unit 21 and the fixed member 22, and the first drive unit 31 for turning the lens unit 21 in the first direction may be configured on the upper face portion of the lens unit 21 and the fixed member 22.

Further, the first drive unit and the second drive unit may also be configured on the other side face portion or on the lower face side of the lens unit 21 and the fixed member 22.

In addition, an example was described above in which the second turning shafts 22a and 22a that function as a turning support in the first direction are provided on the fixed member 22, and the first turning shafts 21a and 21a that function as a turning support in the second direction are provided on the lens unit 21. However, conversely, the turning shafts that function as a turning support in the first direction may be provided on the lens unit, and the second turning shafts that function as a turning support in the second direction may be provided on the fixed member 22. In this case, the support grooves into which the turning shafts that function as a turning support in the first direction are inserted are formed on the fixed member, and the support grooves into which the turning shafts that function as a turning support in the second direction are inserted are formed on the lens unit.

Moreover, an example was described above in which the first drive magnets 24 and 24 and the second drive magnets 25 and 25 are arranged on the lens unit 21, and the first drive coils 26 and 26 and the second drive coils 27 and 27 are arranged on the fixed member 22. However, conversely, the drive coils may be arranged on the lens unit 21 and the drive magnets may be arranged on the fixed member 22.

When the lens unit 21 is turned and the blur correction operation is carried out, the position of the lens unit 21 in the first direction is continuously detected by detecting changes in the magnetic field of the first drive magnets 24 and 24 with the first detection units 28 and 28, and the position of the lens unit 21 in the second direction is continuously detected by detecting changes in the magnetic field of the second drive magnets 25 and 25 with the second detection units 29 and 29.

[Operation of the Image Blur Correction Apparatus (First Embodiment)]

The blur correction operation performed in the image blur correction apparatus 20 and the position detection performed in this operation by will now be described (refer to FIGS. 6 to 21).

In the blur correction operation, detection of the position of the lens unit 21 in the first direction (yaw direction) and in the second direction (pitch direction) is performed by the first detection units 28 and 28 and the second detection units 29 and 29, respectively. In the below, the blur correction operation and four position detection methods performed in this operation will be described, namely, a first position detection method (refer to FIGS. 6 to 9), a second position detection method (refer to FIGS. 10 to 13), a third position detection method (refer to FIGS. 14 to 17), and a fourth position detection method (refer to FIGS. 18 to 21).

It is noted that in FIGS. 6 to 21, (A) are plan views and (B) are side views.

First, the blur correction operation will be described.

In a state before the blur correction operation is carried out, the image blur correction apparatus 20 is at a reference position where there has been no turning in the first direction or the second direction (refer to FIGS. 6, 10, 14, and 18).

In the image blur correction apparatus 20, when power is supplied to the first drive coils 26 and 26 of the first drive unit 30 so that, for example, thrust is produced in the same direction, a blur correction operation is carried out by the lens unit 21 turning in the first direction about the first supporting axis P (refer to FIGS. 7, 11, 15, and 19). At this stage, the blur correction operation of the lens unit 21 is smoothly carried out by the first turning shafts 21*a* and 21*a* sliding along the second support grooves 22*b* and 22*b*, respectively, without the first turning shafts 21*a* and 21*a* causing any hindrance in the turning of the lens unit 21.

On the other hand, when power is supplied to the second drive coils 27 and 27 of the second drive unit 31 so that, for example, thrust is produced in the same direction, a blur correction operation is carried out by the lens unit 21 turning in the second direction about the second first supporting axis Q (refer to FIGS. 8, 12, 16, and 20). At this stage, the blur correction operation of the lens unit 21 is smoothly carried out by the second turning shafts 22*a* and 22*a* sliding along the first support grooves 21*b* and 21*b*, respectively, without the second turning shafts 22*a* and 22*a* causing any hindrance in the turning of the lens unit 21.

Further, when the supply of power to the first drive coils 26 and 26 so that, for example, thrust is produced in the same direction, and the supply of power to the second drive coils 27 and 27 so that, for example, thrust is produced in the same direction, is carried out simultaneously, a blur correction operation is carried out by the lens unit 21 turning in the first direction about the first supporting axis P and the lens unit 21 turning in the second direction about the second first supporting axis Q (refer to FIGS. 9, 13, 17, and 21). At this stage, the blur correction operation of the lens unit 21 is smoothly carried out by the first turning shafts 21*a* and 21*a* sliding along the second support grooves 22*b* and 22*b*, respectively, and the second turning shafts 22*a* and 22*a* sliding along the first support grooves 21*b* and 21*b*, respectively, without the first turning shafts 21*a* and 21*a* or the second turning shafts 22*a* and 22*a* causing any hindrance in the turning of the lens unit 21.

When the lens unit 21 turns in the first direction, the tip of the first turning shafts 21*a* and 21*a* slides along an inner face of the regulating wall portions 22*c* and 22*c*, respectively, so that the lens unit 21 does not move in the light axis direction with respect to the fixed member 22. Further, when the lens unit 21 turns in the second direction too, movement of the first turning shafts 21*a* and 21*a* in the light axis direction is regulated by the regulating wall portions 22*c* and 22*c*, respectively.

Next, the position detection methods will be described.

Position detection of the lens unit 21 in the first direction is performed based on the combined output of the first detection units 28 and 28, and position detection of the lens unit 21 in the second direction is performed based on the combined output of the second detection units 29 and 29. In FIGS. 6 to 21, respectively, Y is the combined output representing the position of the lens unit 21 in the first direction (yaw direction), and P the combined output representing the position of the lens unit 21 in the second direction (pitch direction).

Further, in the drive magnets illustrated in each figure (first magnets 24 and 24, and second magnets 25 and 25), the black colored section represents the N pole and the mottled section represents the S pole. The output at the first detection unit 28 and the second detection unit 29 is, for example, positive (+) when the N pole magnetic field is greater than the S pole magnetic field, and negative (−) when the S pole magnetic field is greater than the N pole magnetic field.

In the below, when positive, the respective outputs are represented as (+)Ya, (+)Yb, (+)Pa, and (+)Pb, and when negative, the respective outputs are represented as (−)Ya, (−)Yb, (−)Pa, and (−)Pb.

<First Position Detection Method>

Ya represents the output of the first detection unit 28 positioned on an upper side, Yb represents the output of the first detection unit 28 positioned on a lower side, Pa represents the output of the second detection unit 29 positioned on a right side, and Pb represents the output of the second detection unit 29 positioned on a left side. In the first position detection method, position detection in the first direction is calculated by Y=Ya−Yb, and position detection in the second direction is calculated by P=Pa−Pb.

A first drive unit 30 that turns the lens unit 21 in the first direction is provided on a side face portion of the lens unit 21 and the fixed member 22, and a second drive unit 31 that turns the lens unit 21 in the second direction is provided on an upper face portion of the lens unit 21 and the fixed member 22.

The first detection units 28 and 28 that detect the position of the lens unit 21 in the first direction are arranged on a side face portion of the lens unit 21 and the fixed member 22, and the second detection units 29 and 29 that detect the position of the lens unit 21 in the second direction are arranged on an upper face portion of the lens unit 21 and the fixed member 22. The first detection unit 28 positioned on the upper side and the second detection unit 29 positioned on the right side are positioned so that their front side is the N pole and rear side is the S pole, and the first detection unit 28 positioned on the lower side and the second detection unit 29 positioned on the left side are positioned so that their front side is the S pole and rear side is the N pole.

When the lens unit 21 is at a reference position (refer to FIG. 6), Ya, Yb, Pa, and Pb are all 0, and the combined outputs Y and P are also both 0.

When the lens unit 21 has been turned in the first direction (to the left) (refer to FIG. 7), the combined output Y in the first direction is calculated by (+)Ya−(−)Yb to be +Y, so that the lens unit 21 is detected as having been turned in the first direction. Further, the combined output P in the second direction is calculated by (−)Pa−(−)Pb to be zero. Therefore, the turning of the lens unit 21 in the first direction has no effect on detection in the second direction.

When the lens unit 21 has been turned in the second direction (upwards) (refer to FIG. 8), the combined output Y in the first direction is calculated by (+)Ya−(+)Yb to be zero, and the combined output P in the second direction is calculated by (+)Pa−(−)Pb to be +P, so that the lens unit 21 is detected as having been turned in the second direction. Therefore, the turning of the lens unit 21 in the second direction has no effect on detection in the first direction.

When the lens unit 21 has been turned in the first direction (to the left) and in the second direction (upwards) (refer to FIG. 9), the combined output Y in the first direction is calculated by (+)Ya−(−)Yb to be +Y since the absolute value of (+)Ya is greater than the absolute value of (−)Yb, so that the lens unit 21 is detected as having been turned in the first direction. Further, the combined output P in the second direction is calculated by (+)Pa−(−)Pb to be +P since the absolute value of (+)Pa is greater than the absolute value of (−)Pb, so that the lens unit 21 is detected as having been turned in the second direction.

It is noted that position detection is carried out in the same manner as described above even when the lens unit 21 is turned in a different direction to those mentioned above for the first direction or the second direction, namely, when the lens unit 21 is turned to the right, turned to the left, turned to the left and downwards, turned to the right and upwards, and turned to the right and downwards.

For example, when the lens unit 21 has been turned in the opposite direction (to the right) to that described above for the first direction, the combined output Y in the first direction is calculated by (−)Ya−(+)Yb to be −Y, so that the lens unit 21 is detected as having been turned in the opposite direction to the first direction. Further, the combined output P in the second direction is calculated by (+)Pa−(+)Pb to be zero. Therefore, the turning of the lens unit 21 in the first direction has no effect on detection in the second direction.

Further, for example, when the lens unit 21 has been turned in the opposite direction (downwards) to that described above for the second direction, the combined output Y in the first direction is calculated by (−)Ya−(−)Yb to be zero, and the combined output P in the second direction is calculated by (−)Pa−(+)Pb to be −P, so that the lens unit 21 is detected as having been turned in the direction opposite to the second direction. Therefore, the turning of the lens unit 21 in the second direction has no effect on detection in the first direction.

Even when the lens unit 21 has been turned in the opposite direction to those described above for the first direction and the second direction, similar to the above, the turning of the lens unit 21 in the one of the directions has no effect on detection in the other direction. Thus, a description of position detection in such cases will be omitted. It is noted that in the below-described second to fourth position detection methods too, a description of when the lens unit 21 has been turned in a different direction will be omitted.

<Second Position Detection Method>

Ya represents the output of the first detection unit 28 positioned on an upper side, Yb represents the output of the first detection unit 28 positioned on a lower side, Pa represents the output of the second detection unit 29 positioned on a right side, and Pb represents the output of the second detection unit 29 positioned on a left side. In the second position detection method, position detection in the first direction is calculated by Y=Ya+Yb, and position detection in the second direction is calculated by P=Pa+Pb.

A first drive unit 30 that turns the lens unit 21 in the first direction is provided on a side face portion of the lens unit 21 and the fixed member 22, and a second drive unit 31 that turns the lens unit 21 in the second direction is provided on an upper face portion of the lens unit 21 and the fixed member 22.

The first detection units 28 and 28 that detect the position of the lens unit 21 in the first direction are arranged on a side face portion of the lens unit 21 and the fixed member 22, and the second detection units 29 and 29 that detect the position of the lens unit 21 in the second direction are arranged on an upper face portion of the lens unit 21 and the fixed member 22. The first detection unit 28 positioned on the upper side, the second detection unit 29 positioned on the right side, the first detection unit 28 positioned on the lower side, and the second detection unit 29 positioned on the left side are each positioned so that their front side is the N pole and rear side is the S pole.

When the lens unit 21 is at a reference position (refer to FIG. 10), Ya, Yb, Pa, and Pb are all 0, and the combined outputs Y and P are also both 0.

When the lens unit 21 has been turned in the first direction (refer to FIG. 11), the combined output Y in the first direction is calculated by (+)Ya+(+)Yb to be +Y, so that the lens unit 21 is detected as having been turned in the first direction. Further, the combined output P in the second direction is calculated by (−)Pa+(+)Pb to be zero. Therefore, the turning of the lens unit 21 in the first direction has no effect on detection in the second direction.

When the lens unit 21 has been turned in the second direction (refer to FIG. 12), the combined output Y in the first direction is calculated by (+)Ya+(−)Yb to be zero, and the combined output P in the second direction is calculated by (+)Pa+(+)Pb to be +P, so that the lens unit 21 is detected as having been turned in the second direction. Therefore, the turning of the lens unit 21 in the second direction has no effect on detection in the first direction.

When the lens unit 21 has been turned in the first direction and in the second direction (refer to FIG. 13), the combined output Y in the first direction is calculated by (+)Ya+(+)Yb to be +Y, so that the lens unit 21 is detected as having been turned in the first direction. Further, the combined output P in the second direction is calculated by (+)Pa+(+)Pb to be +P, so that the lens unit 21 is detected as having been turned in the second direction.

<Third Position Detection Method>

Ya represents the output of the first detection unit 28 positioned on a right side, Yb represents the output of the first detection unit 28 positioned on a left side, Pa represents the output of the second detection unit 29 positioned on a upper side, and Pb represents the output of the second detection unit 29 positioned on a lower side. In the third position detection method, position detection in the first direction is calculated by Y=−Ya−Yb, and position detection in the second direction is calculated by P=Pa+Pb.

A first drive unit 30 that turns the lens unit 21 in the first direction is provided on an upper face portion of the lens unit 21 and the fixed member 22, and a second drive unit 31 that turns the lens unit 21 in the second direction is provided on a side face portion of the lens unit 21 and the fixed member 22.

The first detection units 28 and 28 that detect the position of the lens unit 21 in the first direction are arranged on an upper face portion of the lens unit 21 and the fixed member 22, and the second detection units 29 and 29 that detect the position of the lens unit 21 in the second direction are arranged on a side face portion of the lens unit 21 and the fixed member 22. The first detection unit 28 positioned on the right side and the second detection unit 29 positioned on the upper side are positioned so that their front side is the N pole and rear side is the S pole, and the first detection unit 28 positioned on the left side and the second detection unit 29 positioned on the lower side are positioned so that their front side is the S pole and rear side is the N pole. When the lens unit 21 is at a reference position (refer to FIG. 14), Ya, Yb, Pa, and Pb are all 0, and the combined outputs Y and P are also both 0.

When the lens unit 21 has been turned in the first direction (refer to FIG. 15), the combined output Y in the first direction is calculated by −(−)Ya−(−)Yb to be +Y, so that the lens unit 21 is detected as having been turned in the first direction. Further, the combined output P in the second direction is calculated by (+)Pa+(−)Pb to be zero. Therefore, the turning of the lens unit 21 in the first direction has no effect on detection in the second direction.

When the lens unit 21 has been turned in the second direction (refer to FIG. 16), the combined output Y in the first direction is calculated by −(+)Ya−(−)Yb to be zero, and the combined output P in the second direction is calculated by (+)Pa+(+)Pb to be +P, so that the lens unit 21 is detected as having been turned in the second direction. Therefore, the turning of the lens unit 21 in the second direction has no effect on detection in the first direction.

When the lens unit 21 has been turned in the first direction and in the second direction (refer to FIG. 17), the combined output Y in the first direction is calculated by −(+)Ya−(−)Yb to be +Y since the absolute value of (−)Yb is greater than the absolute value of (−)Ya, so that the lens unit 21 is detected as having been turned in the first direction. Further, the combined output P in the second direction is calculated by (+)Pa+(−)Pb to be +P since the absolute value of (+)Pa is greater than the absolute value of (−)Pb, so that the lens unit 21 is detected as having been turned in the second direction.

<Fourth Position Detection Method>

Ya represents the output of the first detection unit 28 positioned on a right side, Yb represents the output of the first detection unit 28 positioned on a left side, Pa represents the output of the second detection unit 29 positioned on an upper side, and Pb represents the output of the second detection unit 29 positioned on a lower side. In the fourth position detection method, position detection in the first direction is calculated by Y=−Ya+Yb, and position detection in the second direction is calculated by P=Pa−Pb.

A first drive unit 30 that turns the lens unit 21 in the first direction is provided on an upper face portion of the lens unit 21 and the fixed member 22, and a second drive unit 31 that turns the lens unit 21 in the second direction is provided on a side face portion of the lens unit 21 and the fixed member 22.

The first detection units 28 and 28 that detect the position of the lens unit 21 in the first direction are arranged on an upper face portion of the lens unit 21 and the fixed member 22, and the second detection units 29 and 29 that detect the position of the lens unit 21 in the second direction are arranged on a side face portion of the lens unit 21 and the fixed member 22. The first detection unit 28 positioned on the right side, the second detection unit 29 positioned on the upper side, the first detection unit 28 positioned on the left side, and the second detection unit 29 positioned on the lower side are each positioned so that their front side is the N pole and rear side is the S pole.

When the lens unit 21 is at a reference position (refer to FIG. 18), Ya, Yb, Pa, and Pb are all 0, and the combined outputs Y and P are also both 0.

When the lens unit 21 has been turned in the first direction (refer to FIG. 19), the combined output Y in the first direction is calculated by −(−)Ya+(+)Yb to be +Y, so that the lens unit 21 is detected as having been turned in the first direction. Further, the combined output P in the second direction is calculated by (+)Pa−(+)Pb to be zero. Therefore, the turning of the lens unit 21 in the first direction has no effect on detection in the second direction.

When the lens unit 21 has been turned in the second direction (refer to FIG. 20), the combined output Y in the first direction is calculated by −(+)Ya+(+)Yb to be zero, and the combined output P in the second direction is calculated by (+)Pa−(−) Pb to be +P, so that the lens unit 21 is detected as having been turned in the second direction. Therefore, the turning of the lens unit 21 in the second direction has no effect on detection in the first direction.

When the lens unit 21 has been turned in the first direction and in the second direction (refer to FIG. 21), the combined output Y in the first direction is calculated by −(+)Ya+(+)Yb to be +Y since the absolute value of (+)Yb is greater than the absolute value of (+)Ya, so that the lens unit 21 is detected as having been turned in the first direction. Further, the combined output P in the second direction is calculated by (+)Pa−(+)Pb to be +P since the absolute value of (+)(Pa) is greater than the absolute value of (+)Pb, so that the lens unit 21 is detected as having been turned in the second direction.

[Position Detection Method Conclusion]

Thus, in the first position detection method and the second position detection method, a pair of first thrust generation portions of the first drive unit 30 are positioned on opposite sides sandwiching a second supporting axis Q, a pair of second thrust generation portions of the second drive unit 31 are positioned on opposite sides sandwiching a first supporting axis P, and the position of the lens unit 21 in the first direction and the second direction is detected based on the combined output from each of the pair of first detection units 28 and 28 and the combined output from each of the pair of second detection units 29 and 29.

By configuring in such a manner, when the lens unit 21 is turned in either the first direction or the second direction, an effect on the position detection accuracy of the lens unit 21 in the other of the first direction or the second direction can be avoided, which allows the position detection accuracy of the lens unit 21 to be improved by a simple configuration.

Further, in the third position detection method and the fourth position detection method, a pair of first thrust generation portions of the first drive unit 30 are positioned on opposite sides sandwiching a first supporting axis P, a pair of second thrust generation portions of the second drive unit 31 are positioned on opposite sides sandwiching a second supporting axis Q, and the position of the lens unit 21 in the first direction and the second direction is detected based on the combined output from each of the pair of first detection units 28 and 28 and the combined output from each of the pair of second detection units 29 and 29.

Even by configuring in this manner, when the lens unit 21 is turned in either the first direction or the second direction, an effect on the position detection accuracy of the lens unit 21 in the other of the first direction or the second direction can be avoided, which allows the position detection accuracy of the lens unit 21 to be improved by a simple configuration.

In addition, in the image blur correction apparatus 20, since the first drive unit 30 and the second drive unit 31 are provided on the outer periphery side of the lens unit 21, the position detection accuracy of the lens unit 21 can be improved while also reducing the size of the apparatus in the light axis direction.

[Configuration of the Image Blur Correction Apparatus (Second Embodiment)]

Figure 22:
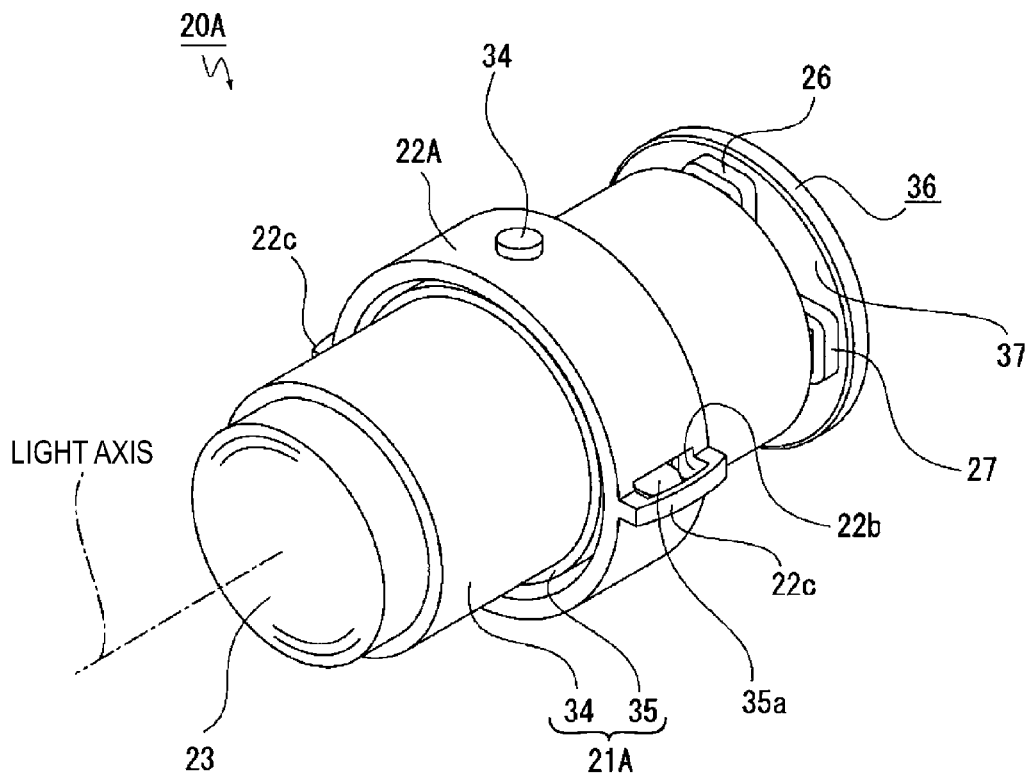
FIG. 22, which along with FIGS. 23 to 29 illustrates a blur correction operation according to a second embodiment of the present technology, is a perspective view of an image blur correction apparatus.
Figure 23:
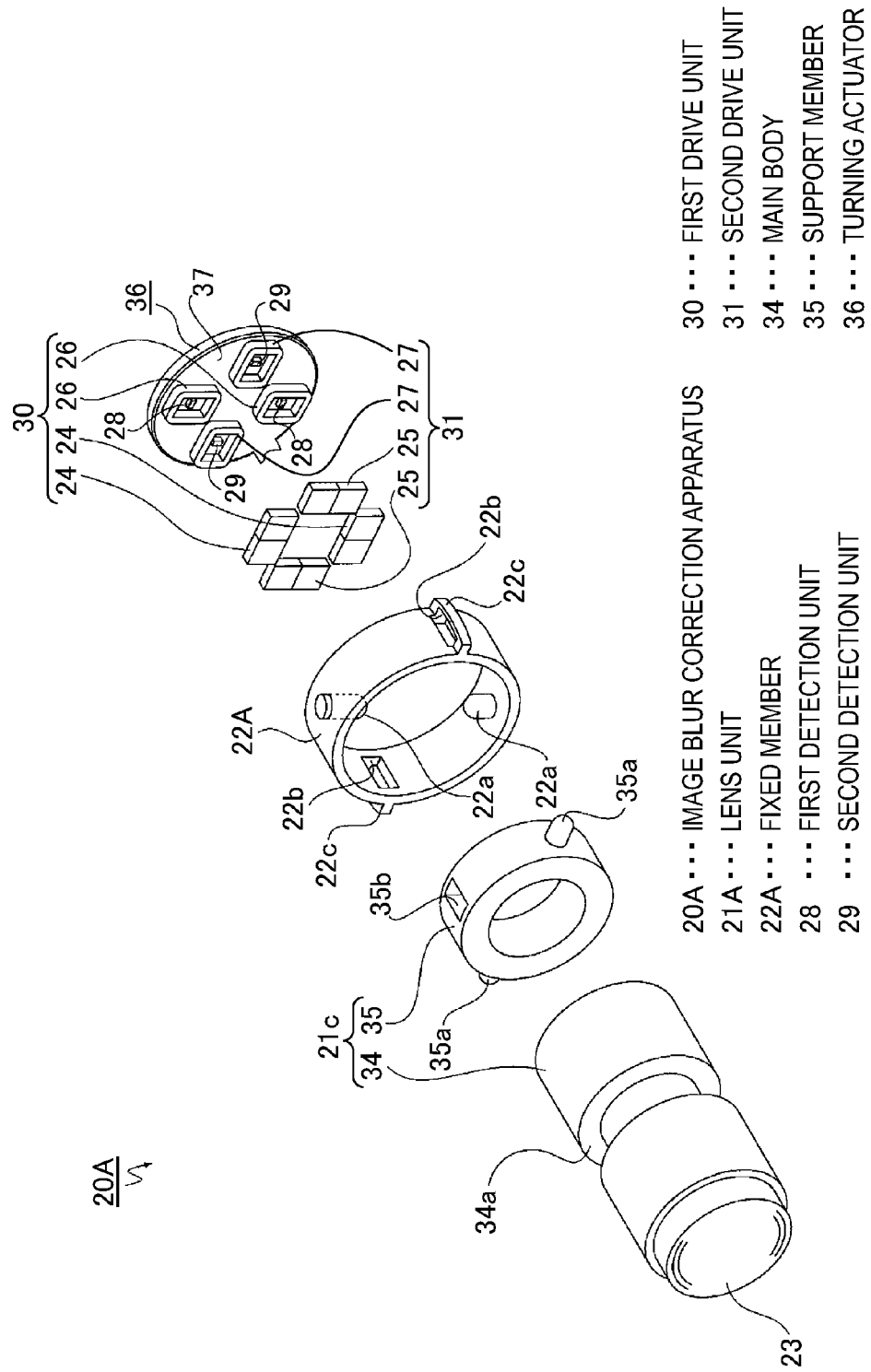
FIG. 23 is an exploded perspective view of an image blur correction apparatus.

An image blur correction apparatus 20A according to a second embodiment of the present technology will now be described (refer to FIGS. 22 and 23).

It is noted that the image blur correction apparatus 20A illustrated below only differs from the above-described image blur correction apparatus 20 in that, in addition to the first direction and the second direction, the lens unit can also be turned in a third direction. Therefore, regarding the image blur correction apparatus 20A, only the parts that are different to the image blur correction apparatus 20 will be described in detail. The other parts are denoted using the same reference numerals as the similar parts in the image blur correction apparatus 20, and a description thereof is omitted.

The image blur correction apparatus 20A has a lens unit 21A and a fixed member 22A that supports the lens unit 21A.

The lens unit 21A is formed in a shape that extends in a light axis direction, and is configured from a main body 34 provided with a plurality of lenses or a lens group that include an imaging lens 23, and a support member that rotatably supports the main body 34 in the direction around the light axis.

The main body 34 is formed in a roughly cylindrical shape, for example. A supported groove 34a that extends in a circumferential direction is formed on a roughly center portion in the front/rear direction on the main body 34. The supported groove 34a is supported by the support member 35. It is noted that the main body 34 may be formed in some other shape than a cylindrical shape, for example, in a rectangular shape.

First drive magnets 24 and 24 and second drive magnets 25 and 25 are attached to the rear face of the main body 34. The first drive magnets 24 and 24 are vertically positioned sandwiching the light axis, and are magnetized so that the N pole and the S pole are in the horizontal direction. The second drive magnets 25 and 25 are horizontally positioned sandwiching the light axis, and are magnetized so that the N pole and the S pole are in the vertical direction.

The support member 35 is formed in a roughly circular shape. On the support member 35, first turning shafts 35a and 35a that protrude outwards are provided on the left and right faces, respectively, and first support grooves 35b and 35b that are open outwards are provided on the upper and lower faces, respectively. The first support grooves 35b and 35b are formed in a shape that extends in the front/rear direction.

A fixed member 22C is formed in a roughly circular shape. The fixed member 22C is provided with second turning shafts 22a and 22a. On the fixed member 22C, second support grooves 22b and 22b are also formed. Further, regulating wall portions 22c and 22c are provided on the fixed member 22C.

A turning actuator 36 is arranged on a rear side face of the lens unit 21A. The turning actuator 36 is configured so as to include the first drive magnets 24 and 24 and the second drive magnets 25 and 25.

A circular substrate 37, for example, facing in the front/rear direction is provided on the turning actuator 36. First drive coils 26 and 26 and second drive coils 27 and 27 are attached to the front face of the substrate 37. The first drive coils 26 and 26 are vertically positioned sandwiching the light axis, and the second drive coils 27 and 27 are horizontally positioned sandwiching the light axis.

First detection units 28 and 28 are arranged in a center portion of the first drive coils 26 and 26, respectively, and second detection units 27 and 27 are arranged in a center portion of the second drive coils 29 and 29, respectively.

In the thus-configured lens unit 21A and fixed member 22A, the first turning shafts 35a and 35a of the lens unit 21A are inserted into the second support grooves 22b and 22b of the fixed member 22A, respectively, and the second turning shafts 22a and 22a of the fixed member 22A are inserted into the first support grooves 35b and 35b of the lens unit 21A, respectively, so that the lens unit 21A is turnably supported on the fixed member 22A. At this stage, since the second support grooves 22b and 22b and the first support grooves 35b and 35b are each formed in a shape that extends in the front/rear direction, the first turning shafts 35a and 35a can slide along the second support grooves 22b and 22b, respectively, and the second turning shafts 22a and 22a can slide along the first support grooves 35b and 35b, respectively.

The lens unit 21A can be turned with respect to the fixed member 22A in a first direction (yaw direction) about the second turning shafts 22a and 22a, and in a second direction (pitch direction) about the first turning shafts 35a and 35a. Further, the main body 34 of the lens unit 21A can be turned with respect to the support member 35 in the direction about the light axis (roll direction), which is a third direction.

The first drive magnets 24 and 24 attached to the lens unit 21A and the first drive coils 26 and 26 are respectively positioned facing the front/rear direction. A first drive unit 30 that turns the lens unit 21A in the first direction or the third direction is configured from the first drive magnets 24 and 24 and the first drive coils 26 and 26. In the first drive unit 30, one of the first drive magnets 24 and one of the first drive coils 26 act as a first thrust generation unit that imparts on the lens unit 21A a turning force (thrust) in the first direction or the third direction. Further, the other first drive magnet 24 and the other first drive coil 26 also act as a first thrust generation unit that imparts on the lens unit 21A a turning force (thrust) in the first direction or the third direction.

On the other hand, the second drive magnets 25 and 25 attached to the lens unit 21A and the second drive coils 27 and 27 are respectively positioned facing the front/rear direction. A second drive unit 31 that turns the lens unit 21A in the first direction or the third direction is configured from the second drive magnets 25 and 25 and the second drive coils 27 and 27. In the second drive unit 31, one of the second drive magnets 25 and one of the second drive coils 27 act as a second thrust generation unit that imparts on the lens unit 21A a turning force (thrust) in the second direction or the third direction. Further, the other second drive magnet 25 and the other second drive coil 27 also act as a second thrust generation unit that imparts on the lens unit 21C a turning force (thrust) in the second direction or the third direction.

It is noted that an example was described above in which the first drive magnets 24 and 24 and the first drive coils 26 and 26 of the first drive unit 30 are positioned vertically spaced apart, and the second drive magnets 25 and 25 and the second drive coils 27 and 27 of the second drive unit 31 are positioned horizontally spaced apart. However, the first drive magnets 24 and 24 and the first drive coils 26 and 26 of the first drive unit 30 may be positioned horizontally spaced apart, and the second drive magnets 25 and 25 and the second drive coils 27 and 27 of the second drive unit 31 may be positioned vertically spaced apart.

Further, an example was described above in which the second turning shafts 22a and 22a that function as a turning support in the first direction are provided on the fixed member 22A, and the first turning shafts 35a and 35a that function as a turning support in the second direction are provided on the lens unit 21A. However, conversely, the turning shafts that function as a turning support in the first direction may be provided on the lens unit, and the second turning shafts that function as a turning support in the second direction may be provided on the fixed member 22A. In this case, the support grooves into which the turning shafts that function as a turning support in the first direction are inserted are formed on the fixed member, and the support grooves into which the turning shafts that function as a turning support in the second direction are inserted are formed on the lens unit.

Further, although an example was described above in which the first drive magnets 24 and 24 and the second drive magnets 25 and 25 are arranged in the lens unit 21C, and the first drive coils 26 and 26 and the second drive coils 27 and 27 are arranged on the substrate 37, conversely, the drive coils may be arranged on the lens unit 21A and the drive magnets may be arranged on the substrate 37.

Thus, in the image blur correction apparatus 20A, the main body 34 and the support member 35 are provided in the lens unit 21A, and the main body 34 can turn in direction about the light axis.

Therefore, the lens unit 21A can also be turned in the direction about the light axis, which is the third direction, so that a blur correction operation can also be performed in the direction about the light axis. Consequently, a substantial improvement in image quality can be achieved.

Further, the main body 34 is turned in the direction about the light axis by the turning actuator 36, which is configured from the first drive unit 30 and the second drive unit 31 that turn the lens unit 21A in the first direction and second direction, respectively.

Therefore, a dedicated drive unit for turning the main body 34 in the direction about the light axis is not necessary, so that the configuration of the lens unit 21 can be made simpler and more compact due to a reduction in the number of parts and used space.

[Operation of the Image Blur Correction Apparatus (Second Embodiment)]

The blur correction operation performed in the image blur correction apparatus 20A and the position detection performed in this operation by will now be described (refer to FIGS. 24 to 29).

In the blur correction operation, detection of the position of the lens unit 21 in the first direction (yaw direction), the second direction (pitch direction), and the third direction (roll direction) is performed by the first detection unit 28 and the second detection unit 29. In the below, the blur correction operation and the position detection method performed in this operation will be described.

First, the blur correction operation will be described.

Figure 24:
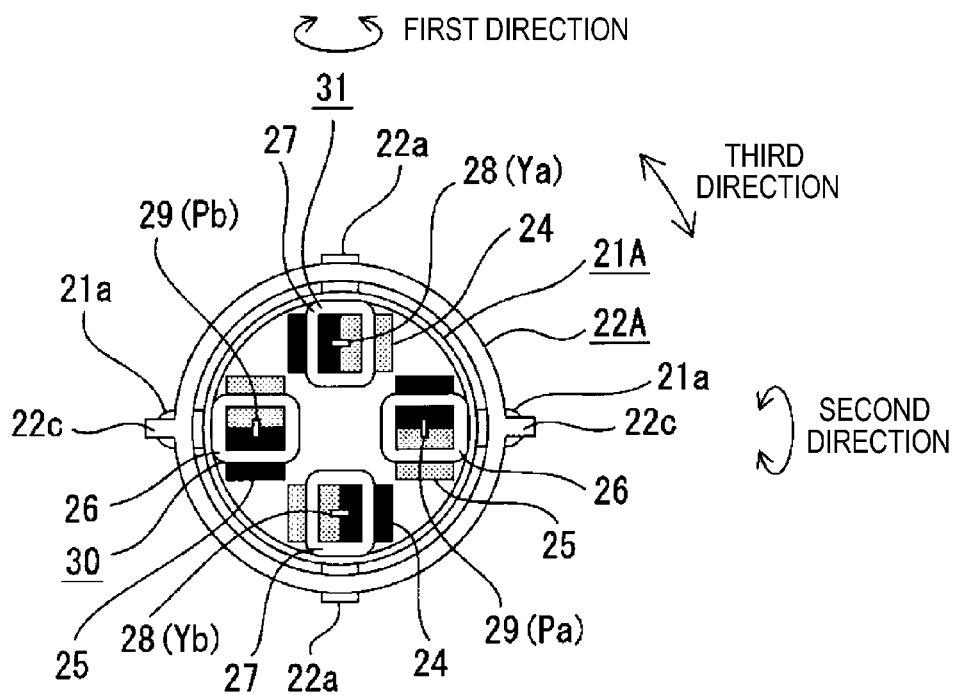
FIG. 24, which along with FIGS. 25 to 29 illustrates a blur correction operation and a position detection method according to a second embodiment of the present technology, illustrates a state in which a lens unit is at a reference position.

In a state before the blur correction operation is carried out, the image blur correction apparatus 20A is at a reference position where there has been no turning in the first direction, or the second direction, or the third direction (refer to FIG. 24).

Figure 25:
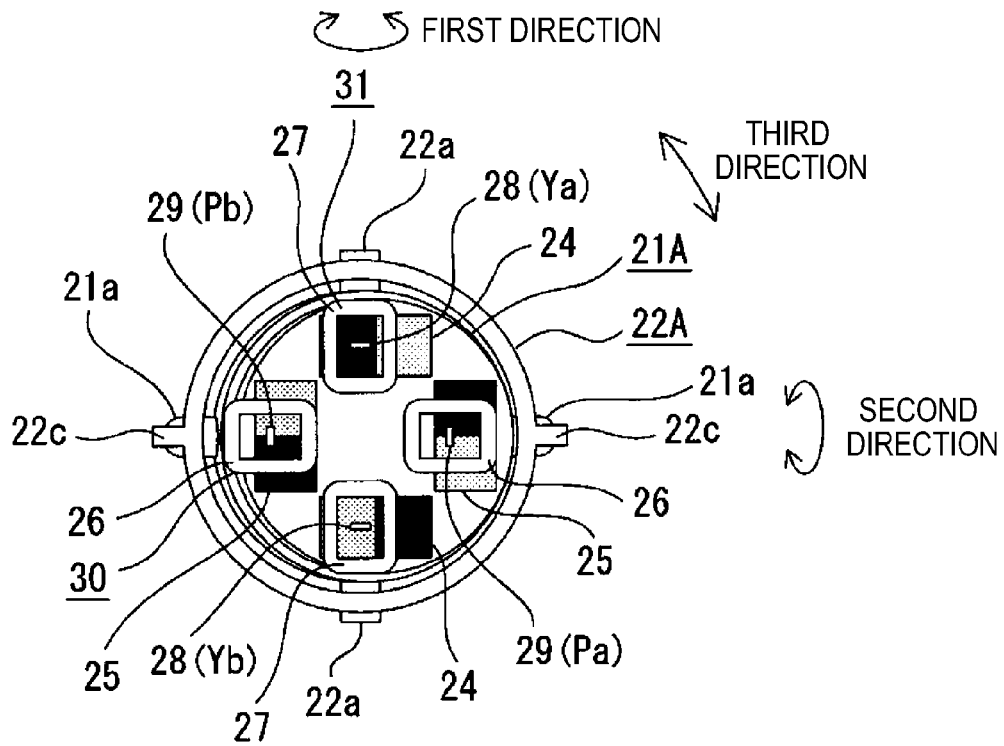
FIG. 25 illustrates a state in which a lens unit has been turned in a first direction.

In the image blur correction apparatus 20A, when power is supplied to the first drive coils 26 and 26 of the first drive unit 30C so that, for example, thrust is produced in the same direction, a blur correction operation is carried out by the lens unit 21 turning in the first direction about the first supporting axis P (refer to FIG. 25). At this stage, the blur correction operation of the lens unit 21A is smoothly carried out by the first turning shafts 35a and 35a sliding along the second support grooves 22b and 22b, respectively, without the first turning shafts 35a and 35a causing any hindrance in the turning of the lens unit 21A.

Figure 26:
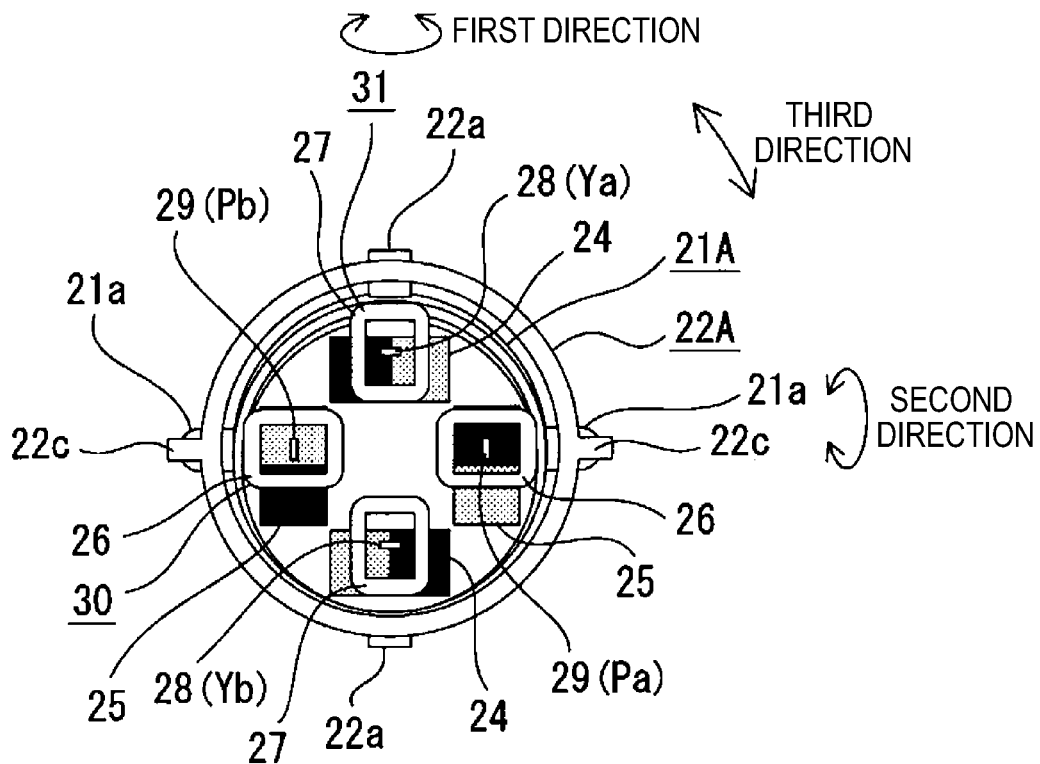
FIG. 26 illustrates a state in which a lens unit has been turned in a second direction.

On the other hand, when power is supplied to the second drive coils 27 and 27 of the second drive unit 31 so that, for example, thrust is produced in the same direction, a blur correction operation is carried out by the lens unit 21A turning in the second direction about the second first supporting axis Q (refer to FIG. 26). At this stage, the blur correction operation of the lens unit 21A is smoothly carried out by the second turning shafts 22a and 22a sliding along the first support grooves 35b and 35b, respectively, without the second turning shafts 22a and 22a causing any hindrance in the turning of the lens unit 21A.

Figure 29:
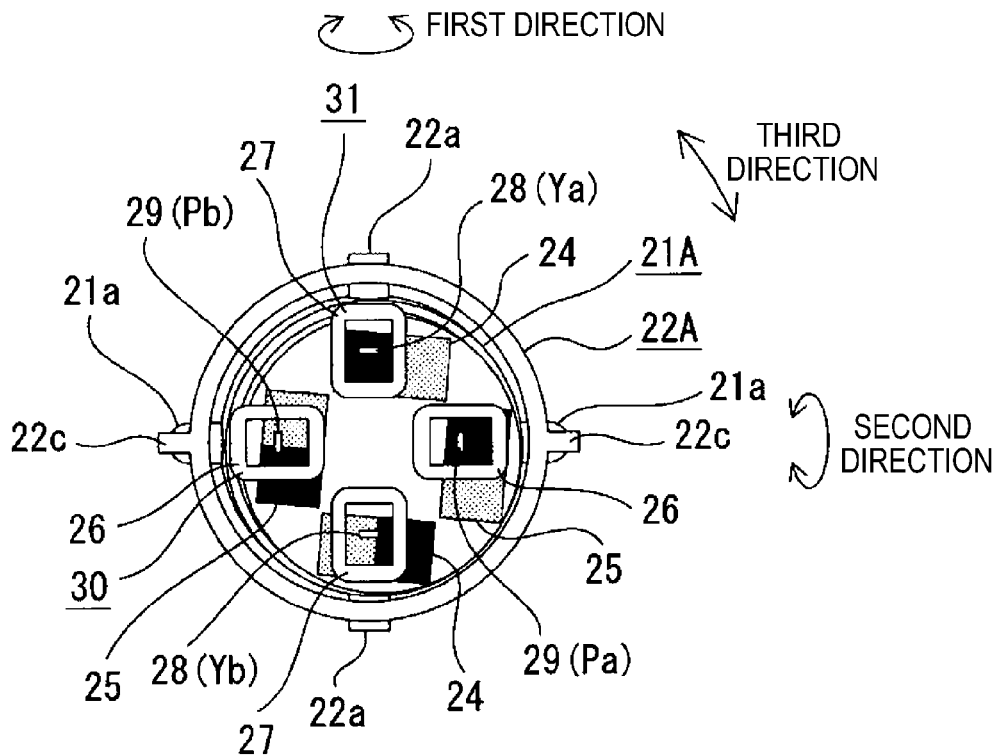
FIG. 29 illustrates a state in which a lens unit has been turned in a first direction, a second direction, and a third direction.

Further, when the supply of power to the first drive coils 26 and 26 so that, for example, thrust is produced in the same direction, and the supply of power to the second drive coils 27 and 27 so that, for example, thrust is produced in the same direction, is carried out simultaneously, a blur correction operation is carried out by the lens unit 21A turning in the first direction about the first supporting axis P and the lens unit 21A turning in the second direction about the second first supporting axis Q (refer to FIG. 29). At this stage, the blur correction operation of the lens unit 21A is smoothly carried out by the first turning shafts 35a and 35a sliding along the second support grooves 22b and 22b, respectively, and the second turning shafts 22a and 22a sliding along the first support grooves 35b and 35b, respectively, without the first turning shafts 35a and 35a or the second turning shafts 22a and 22a causing any hindrance in the turning of the lens unit 21A.

Figure 28:
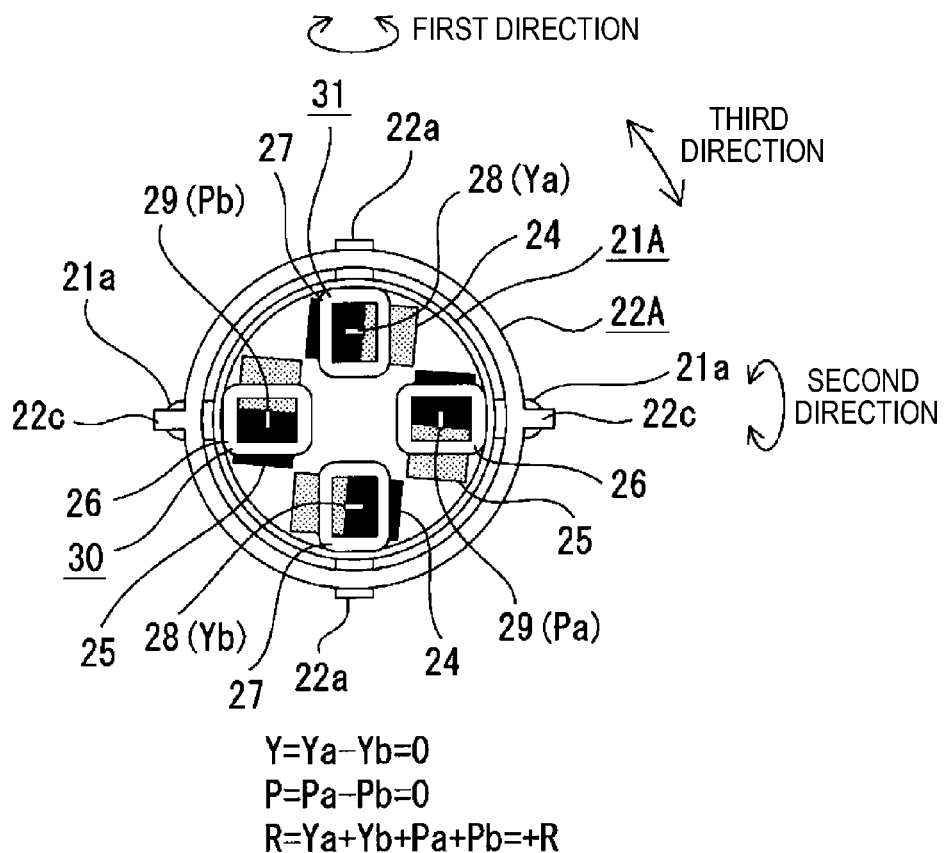
FIG. 28 illustrates a state in which a lens unit has been turned in a third direction.

In addition, when power is supplied to the first drive coils 26 and 26 of the first drive unit 30 so that, for example, thrust is produced in different directions, and power is supplied to the second drive coils 27 and 27 of the second drive unit 31 so that, for example, thrust is produced in different directions, a blur correction operation is carried out by the lens unit 21A turning in the third direction (refer to FIG. 28). It is noted that even when the supply of power to the first drive coils 26 and 26 of the first drive unit 30 so that, for example, thrust is produced in different directions, and the supply of power to the second drive coils 27 and 27 of the second drive unit 31 so that, for example, thrust is produced in different directions, is carried out simultaneously, the lens unit 21A can turn in the third direction.

Figure 27:
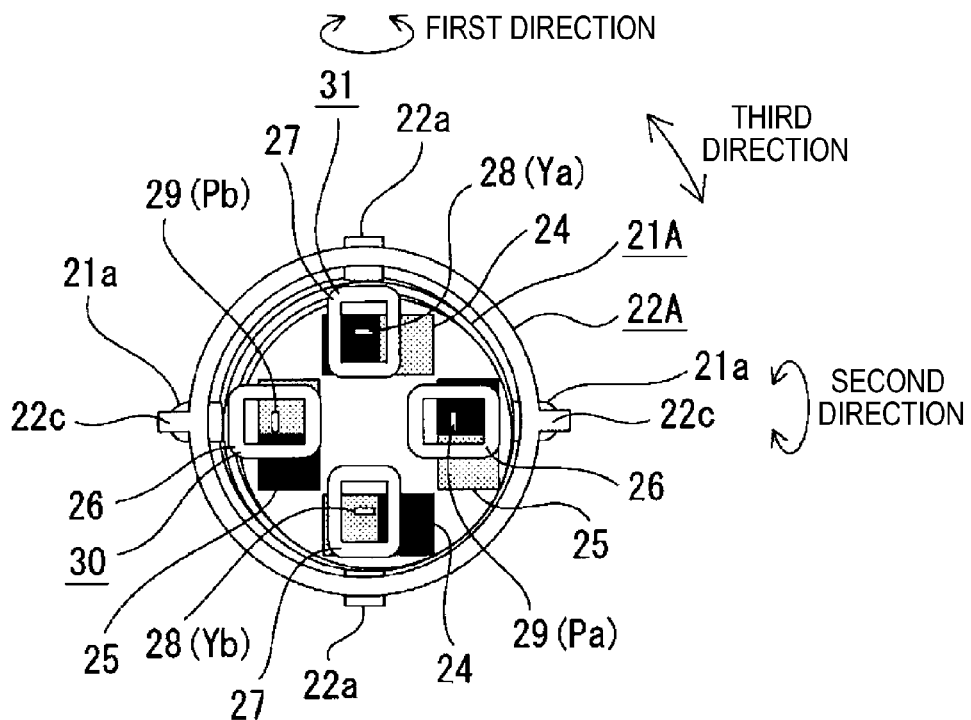
FIG. 27 illustrates a state in which a lens unit has been turned in a first direction and a second direction.

Still further, when the supply of power to the first drive coils 26 and 26 so that, for example, thrust is produced in the same direction, and the supply of power to the second drive coils 27 and 27 so that, for example, thrust is produced in the same direction, is carried out simultaneously, if the power amount to the first drive coils 26 and 26 is different and the power amount to the second drive coils 27 and 27 is different, a blur correction operation is carried out by the lens unit 21C turning in the first direction about the first supporting axis P, the lens unit 21C turning in the second direction about the second first supporting axis Q, and the lens unit 21C also simultaneously turning in the third direction (refer to FIG. 27). At this stage, the blur correction operation of the lens unit 21A is smoothly carried out by the first turning shafts 35a and 35a sliding along the second support grooves 22b and 22b, respectively, and the second turning shafts 22a and 22a sliding along the first support grooves 35b and 35b, respectively, without the first turning shafts 35a and 35a or the second turning shafts 22a and 22a causing any hindrance in the turning of the lens unit 21A.

During the above blur correction operation, the position of the lens unit 21 in the first direction is continuously detected by detecting changes in the magnetic field of the first drive magnets 24 and 24 with the first detection units 28 and 28, and the position of the lens unit 21 in the second direction is continuously detected by detecting changes in the magnetic field of the second drive magnets 25 and 25 with the second detection units 29 and 29. Simultaneously with this, the position of the lens unit 21 in the third direction is continually detected by the first detection units 28 and 28 or the second detection units 29 and 29, or both of these.

Next, the position detection method will be described.

Position detection of the lens unit 21A in the first direction is performed based on the combined output of the first detection units 28 and 28, and position detection of the lens unit 21A in the second direction is performed based on the combined output of the second detection units 29 and 29. Further, position detection of the lens unit 21A in the third direction is performed based on the combined output of the first detection units 28 and 28, the combined output of the second detection units 29 and 29, or the combined output of the first detection units 28 and 28 and the combined output of the second detection units 29 and 29.

In FIGS. 24 to 29, respectively, Y is the combined output representing the position of the lens unit 21A in the first direction (yaw direction), P the combined output representing the position of the lens unit 21A in the second direction (pitch direction), and R is the combined output representing the position of the lens unit 21A in the third direction (roll direction). Ya represents the output of the first detection unit 28 positioned on an upper side, Yb represents the output of the first detection unit 28 positioned on a lower side, Pa represents the output of the second detection unit 29 positioned on a right side, and Pb represents the output of the second detection unit 29 positioned on a left side.

Further, in the drive magnets illustrated in each figure (first magnets 24 and 24, and second magnets 25 and 25), the black colored section represents the N pole and the mottled section represents the S pole. The output at the first detection unit 28 and the second detection unit 29 is, for example, positive (+) when the N pole magnetic field is greater than the S pole magnetic field, and negative (−) when the S pole magnetic field is greater than the N pole magnetic field.

In the below, when the outputs are positive, the respective outputs are represented as (+)Ya, (+)Yb, (+)Pa, and (+)Pb, and when the outputs are negative, the respective outputs are represented as (−)Ya, (−)Yb, (−)Pa, and (−)Pb. If the outputs are zero, the respective outputs are represented as (0)Ya, (0)Yb, (0)Pa, and (0)Pb.

In the below position detection method, position detection in the first direction is calculated by Y=Ya−Yb, position detection in the second direction is calculated by P=Pa−Pb, and position detection in the third direction is calculated by R=Ya+Yb+Pa+Pb. It is noted that position detection in the third direction can also be calculated by R=Ya+Yb or R=Pa+Pb.

When the lens unit 21A is at a reference position (refer to FIG. 24), Ya, Yb, Pa, and Pb are all 0, and the combined outputs Y, P, and R are also all 0.

When the lens unit 21A has been turned in the first direction (refer to FIG. 25), the combined output Y in the first direction is calculated by (+)Ya−(−)Yb to be +Y, so that the lens unit 21A is detected as having been turned in the first direction. The combined output P in the second direction is calculated by (0)Pa−(0)Pb to be zero. Therefore, the turning of the lens unit 21A in the first direction has no effect on detection in the second direction. Further, the combined output R in the third direction is calculated by (+)Ya+(−)Yb+(0)Pa+(0)Pb to be zero. Therefore, the turning of the lens unit 21A in the first direction has no effect on detection in the third direction.

When the lens unit 21A has been turned in the second direction (refer to FIG. 26), the combined output Y in the first direction is calculated by (0)Ya−(0)Yb to be 0, and the combined output P in the second direction is calculated by (+)Pa−(−)Pb to be +P, so that the lens unit 21A is detected as having been turned in the second direction. Therefore, the turning of the lens unit 21A in the second direction has no effect on detection in the first direction. Further, the combined output R in the third direction is calculated by (0)Ya+(0)Yb+(+)Pa+(−)Pb to be zero. Therefore, the turning of the lens unit 21A in the first direction has no effect on detection in the third direction.

When the lens unit 21A has been turned in the first direction and the second direction (refer to FIG. 27), the combined output Y in the first direction is calculated by (+)Ya−(−)Yb to be +Y, so that the lens unit 21A is detected as having been turned in the first direction. The combined output P in the second direction is calculated by (+)Pa−(−)Pb to be +P, so that the lens unit 21A is detected as having been turned in the second direction. Further, the combined output R in the third direction is calculated by (+)Ya+(−)Yb+(+)Pa+(−)Pb to be zero. Therefore, the turning of the lens unit 21A in the first direction and the second direction has no effect on detection in the third direction.

When the lens unit 21A has been turned in the third direction (refer to FIG. 28), the combined output Y in the first direction is calculated by (+)Ya−(+)Yb to be 0, and the combined output P in the second direction is calculated by (+)Pa−(+)Pb to be zero. Further, the combined output R in the third direction is calculated by (+)Ya+(+)Yb+(+)Pa+(+)Pb to be +R, so that the lens unit 21A is detected as having been turned in the third direction. Therefore, the turning of the lens unit 21A in the third direction has no effect on detection in the first direction or the second direction.

When the lens unit 21A has been turned in the first direction, the second direction, and the third direction (refer to FIG. 29), the combined output Y in the first direction is calculated by (+)Ya−(−)Yb to be +Y since the absolute value of (+)Ya is greater than the absolute value of (−)Yb, so that the lens unit 21 is detected as having been turned in the first direction. The combined output P in the second direction is calculated by (+)Pa−(−)Pb to be +P since the absolute value of (+)Pa is greater than the absolute value of (−)Pb, so that the lens unit 21 is detected as having been turned in the second direction. Further, the combined output R in the third direction is calculated by (+)Ya+(−)Yb+(+)Pa+(−)Pb to be +R since the absolute value of (+)Ya and (+)Pa is greater than the absolute value of (−)Yb and (−)Pb, so that the lens unit 21 is detected as having been turned in the third direction.

It is noted that position detection is carried out in the same manner as described above even when the lens unit 21A is turned in a different direction to those mentioned above for the first direction, the second direction, or the third direction.

For example, when the lens unit 21A has been turned in the opposite direction to that described above for the first direction, the combined output Y in the first direction is calculated by (−)Ya−(+)Yb to be −Y, so that the lens unit 21A is detected as having been turned in the opposite direction to the first direction. The combined output P in the second direction is calculated by (0)Pa−(0)Pb to be zero. Therefore, the turning of the lens unit 21A in the first direction has no effect on detection in the second direction. Further, the combined output R in the third direction is calculated by (−)Ya+(+)Yb+

(0)Pa+(0)Pb to be zero. Therefore, the turning of the lens unit 21A in the first direction has no effect on detection in the third direction.

Even when the lens unit 21A has been turned in the opposite direction to those described above for the first direction, the second direction, or the third direction, similar to the above, the turning of the lens unit 21A in either the first direction, the second direction, or the third direction has no effect on detection in the other directions. Thus, a description of position detection in such cases will be omitted.

Thus, in the image blur correction apparatus 20A, since the first drive unit 30 and the second drive unit 31 are provided on the outer face side of the lens unit 21 in the light axis direction, the position detection accuracy of the lens unit 21A can be improved while also reducing the size of the apparatus in the direction orthogonal to the light axis.

[Imaging Apparatus Embodiment]

FIG. 30 illustrates a block diagram of a video camera according to an embodiment of the imaging apparatus of the present technology.

An imaging apparatus (video camera) 100 (corresponding to the imaging apparatus 1) has a lens unit 101 (corresponding to lens units 21, and 21A) that is responsible for an imaging function, a camera signal processing unit 102 that performs signal processing such as analog-digital conversion of a captured image signal, and an image processing unit 103 that performs recording and playback processing of the image signal. Further, the imaging apparatus 100 includes an image display unit 104 such as a liquid crystal panel, which displays captured images and the like, a R/W (reader/writer) 105 that reads/writes image signals from/to a memory card 1000, a CPU (central processing unit) 106 that controls the whole imaging apparatus 100, an input unit 107 (corresponding to operating switch 7, operating button 8, and operating button 10) configured from various switches and the like, on which operations are performed by the user, and a lens drive control unit 108 that controls the drive of the lenses arranged in the lens unit 101.

The lens unit 101 is configured from, for example, an optical system that includes a lens group 109 (corresponding to the lens group provided in the lens units 21, and 21A), and an image sensor 110 such as a CCD (charge-coupled device) or a CMOS (complementary metal-oxide semiconductor) and the like.

The camera signal processing unit 102 performs various types of signal processing, such as conversion of an output signal from the image sensor 110 into a digital signal, noise reduction, image correction, and conversion into luminance/color difference signal.

The image processing unit 103 performs, for example, compression and encoding/decompression and decoding of image signals based on a predetermined image data format, and conversion processing of the data specification, such as the resolution.

The image display unit 104 has a function for displaying various data, such as an operation state and captured images, on the input unit 107 of the user.

The R/W 105 performs writing of the image data encoded by the image processing unit 103 onto the memory card 1000 and reading of the image data recorded on the memory card 1000.

The CPU 106 functions as a control processing unit that controls the respective circuit blocks provided in the imaging apparatus 100, and controls the respective circuit blocks based on instruction input signals and the like from the input unit 107.

The input unit 107 is configured from, for example, a shutter release lever for performing a shutter operation, and a selection switch for selecting an operation mode. The input unit 107 outputs instruction input signals to the CPU 106 based on the operation made by the user.

The lens drive control unit 108 controls (not illustrated) motors and the like that drive the respective lenses of the lens group 109 based on control signals from the CPU 106.

The memory card 1000 is, for example, a semiconductor memory that can be inserted into and removed from a slot connected to the R/W 105.

The operations performed by the imaging apparatus 100 will now be described.

In an imaging standby state, under the control of the CPU 106, an image signal captured by the lens unit 101 is output to the image display unit 104 via the camera signal processing unit 102, and is displayed as a camera still image. Further, when an instruction input signal for zooming is input from the input unit 107, the CPU 106 outputs a control signal to the lens drive control unit 108, and a predetermined lens in the lens group 109 is moved based on a control from the lens drive control unit 108.

When a (not illustrated) shutter in the lens unit 101 is operated by an instruction input signal from the input unit 107, the captured image signal is output from the camera signal processing unit 102 to the image processing unit 103, subjected to compression and encoding processing, and is converted into digital data having a predetermined data format. The converted data is output to the R/W 105, and is written in the memory card 1000.

Focusing and zooming are performed by the lens drive control unit 108 moving a predetermined lens in the lens group 109 based on a control signal from the CPU 106.

When playing back image data recorded in the memory card 1000, based on an operation on the input unit 107, predetermined image data is read from the memory card 1000 by the R/W 105, and decompression and decoding processing is performed by the image processing unit 103. Then, the playback image signal is output to the image display unit 104, and the playback image is displayed.

CONCLUSION

Thus, in the imaging apparatus 1, a pair of first thrust generation portions of the first drive unit 30 and a pair of second thrust generation portions of the second drive unit 31 are positioned on opposite sides sandwiching a second supporting axis Q or a first supporting axis P, respectively, and the position of the lens unit 21 in the first direction and the second direction is detected based on the combined output from each of the pair of first detection units 28 and 28 and the combined output from each of the pair of second detection units 29 and 29.

Therefore, when the lens unit 21 is turned in either the first direction or the second direction, there is no effect on the position detection of the lens unit 21 in the other of the first direction or the second direction, so that the position detection accuracy of the lens unit 21 can be improved.

[Present Technology]

Additionally, the present technology may also be configured as below.

(1) An image blur correction apparatus including:

a lens unit configured include at least one lens, and configured to be turnable in a first direction which is a direction about a first supporting axis that is orthogonal to a light axis of the lens with respect to an outer housing, and in a second direction which is a direction about a second supporting axis that is orthogonal to the light axis and the first supporting axis;

a fixed member configured to turnably support the lens unit in the first direction and the second direction;

a first drive unit configured to include a pair of first thrust generation units that applies thrust that turns the lens unit in the first direction and that is positioned on opposite sides sandwiching one of the first supporting axis and the second supporting axis;

a second drive unit configured to include a pair of second thrust generation units that applies thrust that turns the lens unit in the second direction and that is positioned on opposite sides sandwiching another of the first supporting axis and the second supporting axis;

a pair of first detection units configured to be positioned on opposite sides sandwiching one of the first supporting axis and the second supporting axis; and a pair of second detection units configured to be positioned on opposite sides sandwiching another of the first supporting axis and the second supporting axis, wherein a position in the first direction of the lens unit is detected based on a combined output of the pair of first detection units, and wherein a position in the second direction of the lens unit is detected based on a combined output of the pair of second detection units.

(2) The image blur correction apparatus according to (1),
wherein the pair of first thrust generation units is positioned on opposite sides sandwiching the second supporting axis,
wherein the pair of second thrust generation units is positioned on opposite sides sandwiching the first supporting axis,
wherein the pair of first detection units is positioned on opposite sides sandwiching the second supporting axis, and
wherein the pair of second detection units is positioned on opposite sides sandwiching the first supporting axis.

(3) The image blur correction apparatus according to (1),
wherein the pair of first thrust generation units is positioned on opposite sides sandwiching the first supporting axis,
wherein the pair of second thrust generation units is positioned on opposite sides sandwiching the second supporting axis,
wherein the pair of first detection units is positioned on opposite sides sandwiching the first supporting axis, and
wherein the pair of second detection units is positioned on opposite sides sandwiching the second supporting axis.

(4) The image blur correction apparatus according to any one of (1) to (3), wherein the first drive unit and the second drive unit are provided on an outer periphery side of the lens unit.

(5) The image blur correction apparatus according to any one of (1) to (3), wherein the first drive unit and the second drive unit are provided on an outer face side of the lens unit in a light axis direction.

(6) The image blur correction apparatus according to any one of (1) to (5),
wherein the lens unit is provided thereon with a main body that includes the lens and a support member that turnably supports the main body in a direction about the light axis, and
wherein the main body is able to turn in the direction about the light axis.

(7) The image blur correction apparatus according to (6),
wherein a turning actuator is configured from the first drive unit and the second drive unit, and
wherein the main body is configured to be turned in the direction about the light axis by the turning actuator.

(8) An imaging apparatus including:
an image blur correction apparatus configured to include a lens unit that includes at least one lens and an outer housing that has the lens unit arranged therein,
wherein the lens unit is configured to correct image blur by turning in a first direction which is a direction about a first supporting axis that is orthogonal to a light axis of the lens with respect to the outer housing, and in a second direction about a second supporting axis which is orthogonal to the light axis and the first supporting axis, and
wherein the image blur correction apparatus includes
a fixed member configured to turnably support the lens unit in the first direction and the second direction,
a first drive unit configured to include a pair of first thrust generation units that applies thrust that turns the lens unit in the first direction and that is positioned on opposite sides sandwiching one of the first supporting axis and the second supporting axis,
a second drive unit configured to include a pair of second thrust generation units that applies thrust that turns the lens unit in the second direction and that is positioned on opposite sides sandwiching another of the first supporting axis and the second supporting axis,
a pair of first detection units configured to be positioned on opposite sides sandwiching one of the first supporting axis and the second supporting axis, and
a pair of second detection units configured to be positioned on opposite sides sandwiching another of the first supporting axis and the second supporting axis,
wherein a position in the first direction of the lens unit is detected based on a combined output of the pair of first detection units, and
wherein a position in the second direction of the lens unit is detected based on a combined output of the pair of second detection units.

It should be understood by those skilled in the art that various modifications, combinations, sub-combinations and alterations may occur depending on design requirements and other factors insofar as they are within the scope of the appended claims or the equivalents thereof.

The present disclosure contains subject matter related to that disclosed in Japanese Priority Patent Application JP 2012-122333 filed in the Japan Patent Office on May 29, 2012, the entire content of which is hereby incorporated by reference.

What is claimed is:
1. An image blur correction apparatus comprising:
a lens unit configured include at least one lens, and configured to be turnable in a first direction which is a direction about a first supporting axis that is orthogonal to a light axis of the lens with respect to an outer housing, and in a second direction which is a direction about a second supporting axis that is orthogonal to the light axis and the first supporting axis;
a fixed member configured to turnably support the lens unit in the first direction and the second direction;
a first drive unit configured to include a pair of first thrust generation units that applies thrust that turns the lens unit in the first direction and that is positioned on opposite sides sandwiching one of the first supporting axis and the second supporting axis;

a second drive unit configured to include a pair of second thrust generation units that applies thrust that turns the lens unit in the second direction and that is positioned on opposite sides sandwiching another of the first supporting axis and the second supporting axis;

a pair of first detection units configured to be positioned on opposite sides sandwiching one of the first supporting axis and the second supporting axis; and a pair of second detection units configured to be positioned on opposite sides sandwiching another of the first supporting axis and the second supporting axis, wherein a position in the first direction of the lens unit is detected based on a combined output of the pair of first detection units, and wherein a position in the second direction of the lens unit is detected based on a combined output of the pair of second detection units.

2. The image blur correction apparatus according to claim 1, wherein the pair of first thrust generation units is positioned on opposite sides sandwiching the second supporting axis, wherein the pair of second thrust generation units is positioned on opposite sides sandwiching the first supporting axis, wherein the pair of first detection units is positioned on opposite sides sandwiching the second supporting axis, and wherein the pair of second detection units is positioned on opposite sides sandwiching the first supporting axis.

3. The image blur correction apparatus according to claim 1, wherein the pair of first thrust generation units is positioned on opposite sides sandwiching the first supporting axis, wherein the pair of second thrust generation units is positioned on opposite sides sandwiching the second supporting axis, wherein the pair of first detection units is positioned on opposite sides sandwiching the first supporting axis, and wherein the pair of second detection units is positioned on opposite sides sandwiching the second supporting axis.

4. The image blur correction apparatus according to claim 1, wherein the first drive unit and the second drive unit are provided on an outer periphery side of the lens unit.

5. The image blur correction apparatus according to claim 1, wherein the first drive unit and the second drive unit are provided on an outer face side of the lens unit in a light axis direction.

6. The image blur correction apparatus according to claim 1, wherein the lens unit is provided thereon with a main body that includes the lens and a support member that turnably supports the main body in a direction about the light axis, and wherein the main body is able to turn in the direction about the light axis.

7. The image blur correction apparatus according to claim 6, wherein a turning actuator is configured from the first drive unit and the second drive unit, and wherein the main body is configured to be turned in the direction about the light axis by the turning actuator.

8. An imaging apparatus comprising:

an image blur correction apparatus configured to include a lens unit that includes at least one lens and an outer housing that has the lens unit arranged therein, wherein the lens unit is configured to correct image blur by turning in a first direction which is a direction about a first supporting axis that is orthogonal to a light axis of the lens with respect to the outer housing, and in a second direction about a second supporting axis which is orthogonal to the light axis and the first supporting axis, and wherein the image blur correction apparatus includes a fixed member configured to turnably support the lens unit in the first direction and the second direction, a first drive unit configured to include a pair of first thrust generation units that applies thrust that turns the lens unit in the first direction and that is positioned on opposite sides sandwiching one of the first supporting axis and the second supporting axis, a second drive unit configured to include a pair of second thrust generation units that applies thrust that turns the lens unit in the second direction and that is positioned on opposite sides sandwiching another of the first supporting axis and the second supporting axis, a pair of first detection units configured to be positioned on opposite sides sandwiching one of the first supporting axis and the second supporting axis, and a pair of second detection units configured to be positioned on opposite sides sandwiching another of the first supporting axis and the second supporting axis, wherein a position in the first direction of the lens unit is detected based on a combined output of the pair of first detection units, and wherein a position in the second direction of the lens unit is detected based on a combined output of the pair of second detection units.

* * * * *